(12) United States Patent
Hauser et al.

(10) Patent No.: US 6,951,093 B1
(45) Date of Patent: Oct. 4, 2005

(54) TRANSMISSION SHAFT ROTATION SENSOR SWITCH

(75) Inventors: Raymond Hauser, Sullivan, IL (US); Lonnie E. Holder, Sullivan, IL (US); Scott W. Keller, Charleston, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 54 days.

(21) Appl. No.: 10/364,237

(22) Filed: Feb. 11, 2003

(51) Int. Cl.[7] ............................................. A01D 69/08
(52) U.S. Cl. ...................................... 56/11.8; 56/10.2 R
(58) Field of Search ........................... 56/10.2 R, 10.5, 56/10.8, 11.8; 477/110; 74/810.1; 192/30 W

(56) References Cited

U.S. PATENT DOCUMENTS

| | | |
|---|---|---|
| 3,984,967 A | 10/1976 | Jones |
| 3,999,643 A | 12/1976 | Jones |
| 5,079,969 A * | 1/1992 | Kato et al. ................... 477/109 |
| 5,314,038 A | 5/1994 | Peterson, Jr. |
| 5,438,831 A | 8/1995 | Okada |
| 5,601,512 A | 2/1997 | Scag |
| 5,994,857 A | 11/1999 | Peterson, Jr. et al. |
| 6,026,634 A | 2/2000 | Peter et al. |
| 6,085,502 A | 7/2000 | Wians et al. |
| 6,105,348 A | 8/2000 | Turk et al. |
| 6,109,009 A | 8/2000 | Benson |
| 6,109,010 A | 8/2000 | Heal et al. |
| 6,339,916 B1 | 1/2002 | Benson |
| 6,405,513 B1 | 6/2002 | Hancock et al. |
| 6,510,838 B2 * | 1/2003 | Hur ........................ 123/339.16 |
| 6,625,963 B2 * | 9/2003 | Johnson ...................... 56/10.8 |
| 2001/0042363 A1 | 11/2001 | Walters |

* cited by examiner

Primary Examiner—Meredith C. Petravick
(74) Attorney, Agent, or Firm—Neal, Gerber & Eisenberg LLP

(57) ABSTRACT

A system for use with a vehicle such as a tractor having an output device such as a mower deck or snow thrower comprising a sensor positioned to detect the rotational direction of a shaft such as an output axle. The operational status of the output device can be changed depending on the rotational direction of the shaft.

44 Claims, 22 Drawing Sheets

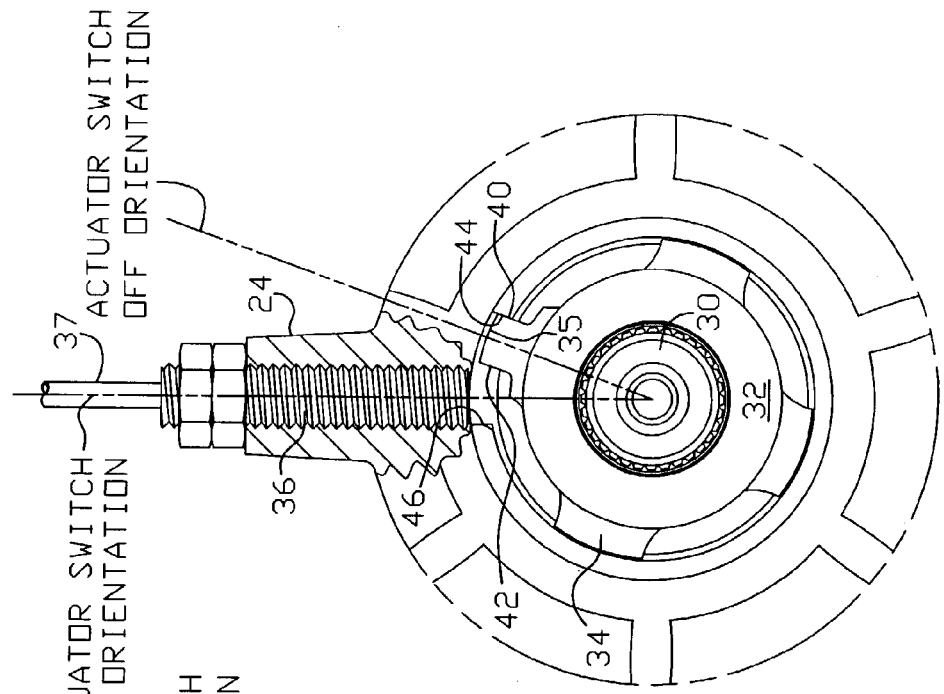
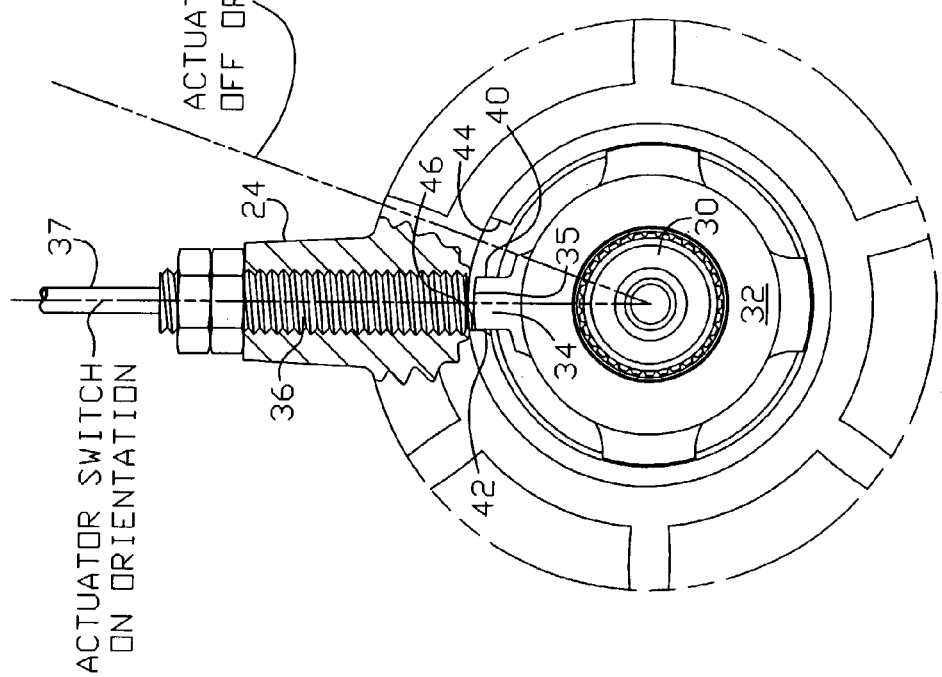

TRANSMISSION SHAFT ROTATION SENSOR SWITCH

BACKGROUND OF THE INVENTION

This invention relates to a cutoff switch for a mower blade or other powered device of a vehicle such as a tractor. The invention herein is disclosed in connection with a tractor using an integrated hydrostatic transaxle as the preferred embodiment. It will be understood that this invention can be used with any transmission or transaxle where the direction of travel is based on rotation of a shaft.

SUMMARY OF THE INVENTION

The invention disclosed herein comprises a reverse cutoff switch that may be used to disconnect power to a mower blade clutch or other device or vehicle system whenever the vehicle is switched into reverse. By way of example, but not limitation, this system could be used with a backup warning system to generate a visual and/or auditory signal that the vehicle is in reverse, or with a snow thrower to switch off the snow thrower blades when the vehicle is moving in reverse. In the preferred embodiment, the switch device is located internal to the transaxle and relies on the actual rotation of a gear train shaft or output axle shaft to define reverse movement of the vehicle.

Most of the embodiments described herein show a switch which is triggered when the transmission or axle shaft rotates in the reverse direction, in order to disable a vehicle system or output device (such as the mower blade) when the vehicle is moving in reverse. It will be understood, however, that it may be desired to have the switch triggered when the axle shaft is rotated in forward to activate or deactivate an appropriate vehicle system. Such an embodiment of this invention is also described and shown herein.

Other benefits and objects of this invention are disclosed herein and will be obvious to readers of ordinary skill in the art. The features disclosed herein can be combined to create a unique design; it is understood, however, that such features are unique in their own right and can be used independently with other transmission transaxle or vehicle designs, as will be obvious to one of ordinary skill in the art.

BRIEF DESCRIPTION OF THE DRAWINGS

FIG. 5 is a detail view of a switch in accordance with one embodiment of this invention, with the switch in the "on" position.

FIG. 6 is a detail view of the switch shown in FIG. 5, with the switch in the "off" position.

DETAILED DESCRIPTION OF THE DRAWINGS

As noted above, this invention is described herein with respect to a vehicle including an integrated hydrostatic transaxle, but it will be understood that this invention is not limited to such an application. Multiple embodiments of this invention are depicted in the figures and described below. Identical structure in the different embodiments is given identical numerals throughout; where appropriate, different prefixes are used to differentiate between structure that is similar but not identical.

Figure 1:
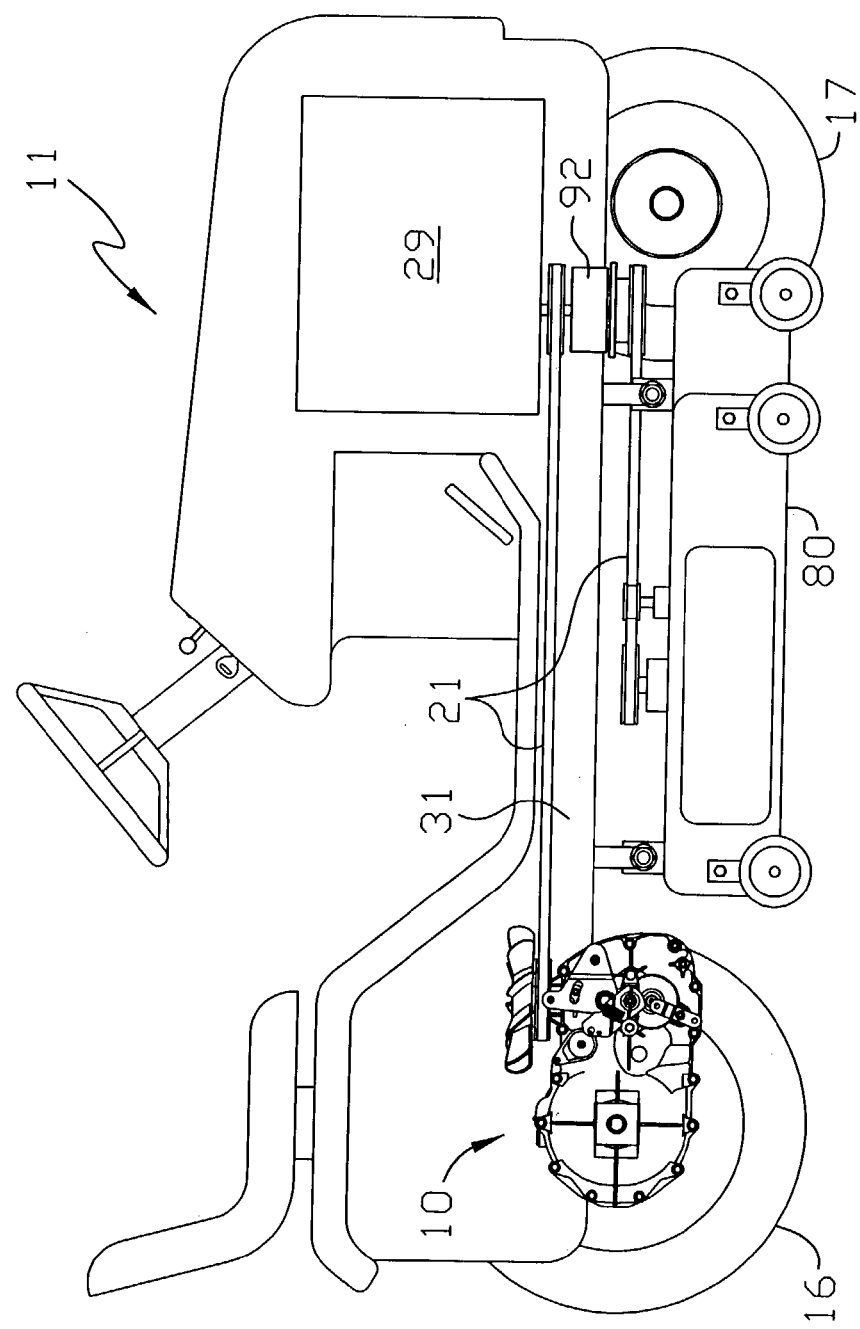
FIG. 1 is a side elevational view of a vehicle including a transaxle incorporating the present invention.
Figure 2:
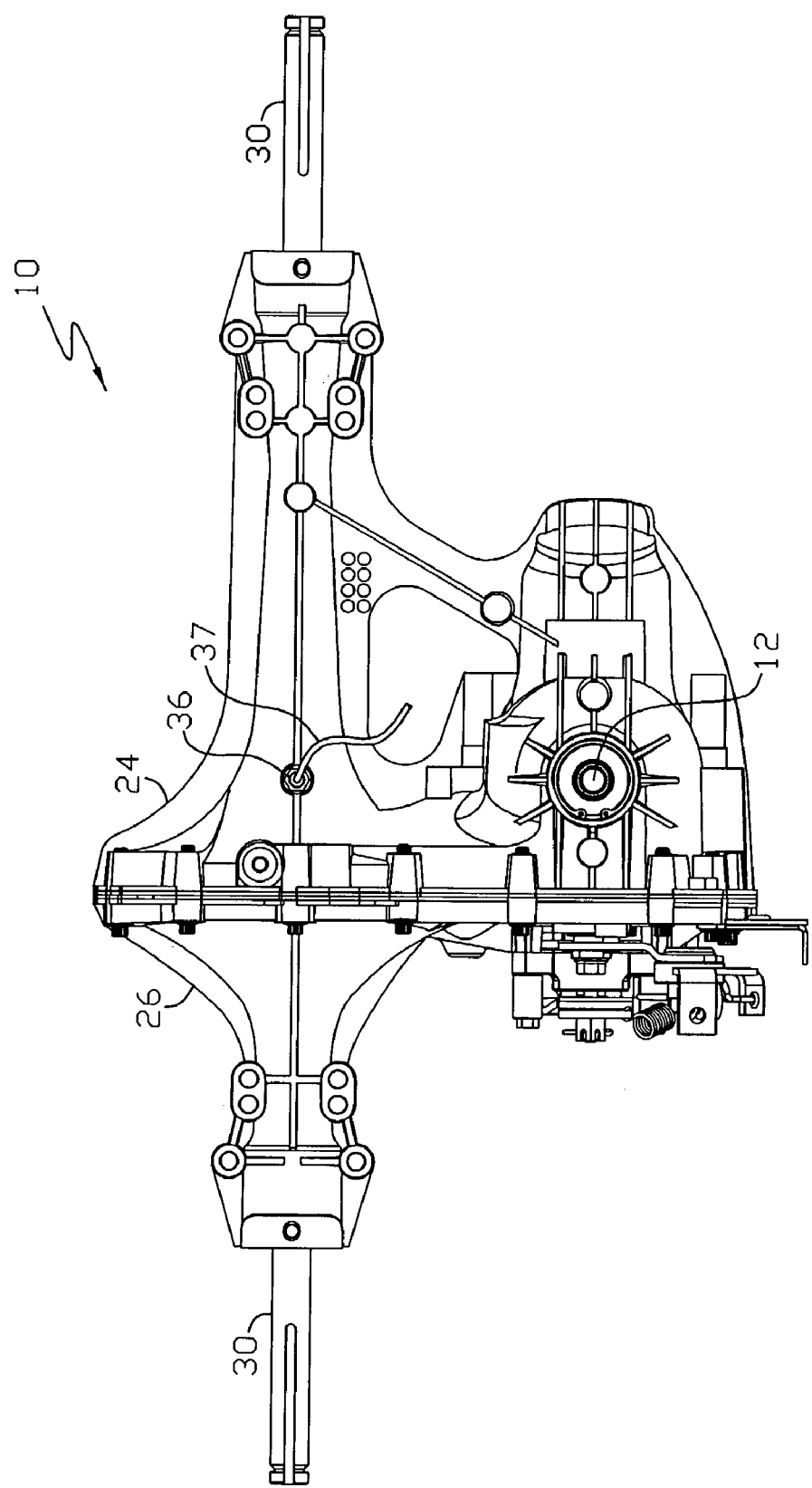
FIG. 2 is a top plan view of the hydrostatic transaxle shown in FIG. 1.
Figure 3:
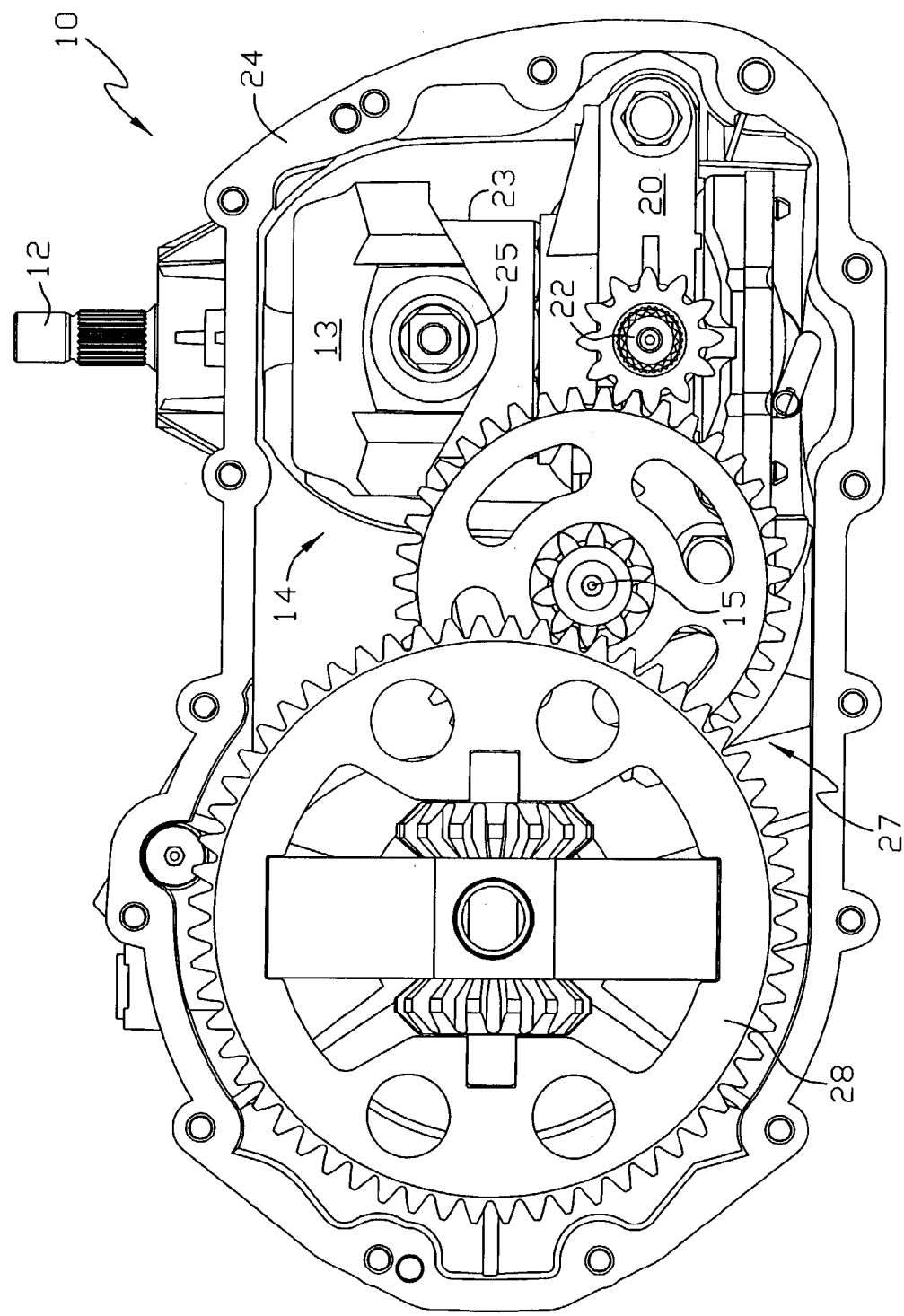
FIG. 3 is a side elevational view of a portion of the hydrostatic transaxle shown in FIG. 2 with certain portions, including one side housing, removed for clarity.

FIG. 1 shows a typical vehicle 11 having an engine 29 mounted on a vehicle frame 31, rear drive wheels 16 and front steering wheels 17; one of the wheels 16 and 17 have been removed from this figure for clarity. A hydrostatic transaxle 10 is mounted towards the rear of the vehicle to power both drive wheels 16 by means of a belt drive system 21 which also powers a mower deck 80 through a clutch 92. All of these elements and the interconnections therebetween are well-known in the art and will not be described in detail. Transaxle 10 is shown in more detail in FIGS. 2–4; this transaxle depicted herein is very similar to that shown in U.S. Pat. No. 6,253,637, the terms of which are incorporated herein by reference.

The operation of transaxle 10 is also well known and will not be described in detail herein. The hydrostatic transaxle comprises hydraulic and gear elements located inside a housing formed by casing members 24 and 26. A hydrostatic pump assembly 14 is mounted on a center section 20 and driven by input shaft 12. Swash plate apparatus 13 is moved by means of trunnion 25 and controls the output of pump cylinder block 23, which controls the speed and direction of a hydraulic motor (not shown), which in turn drives motor shaft 22.

Figure 4:
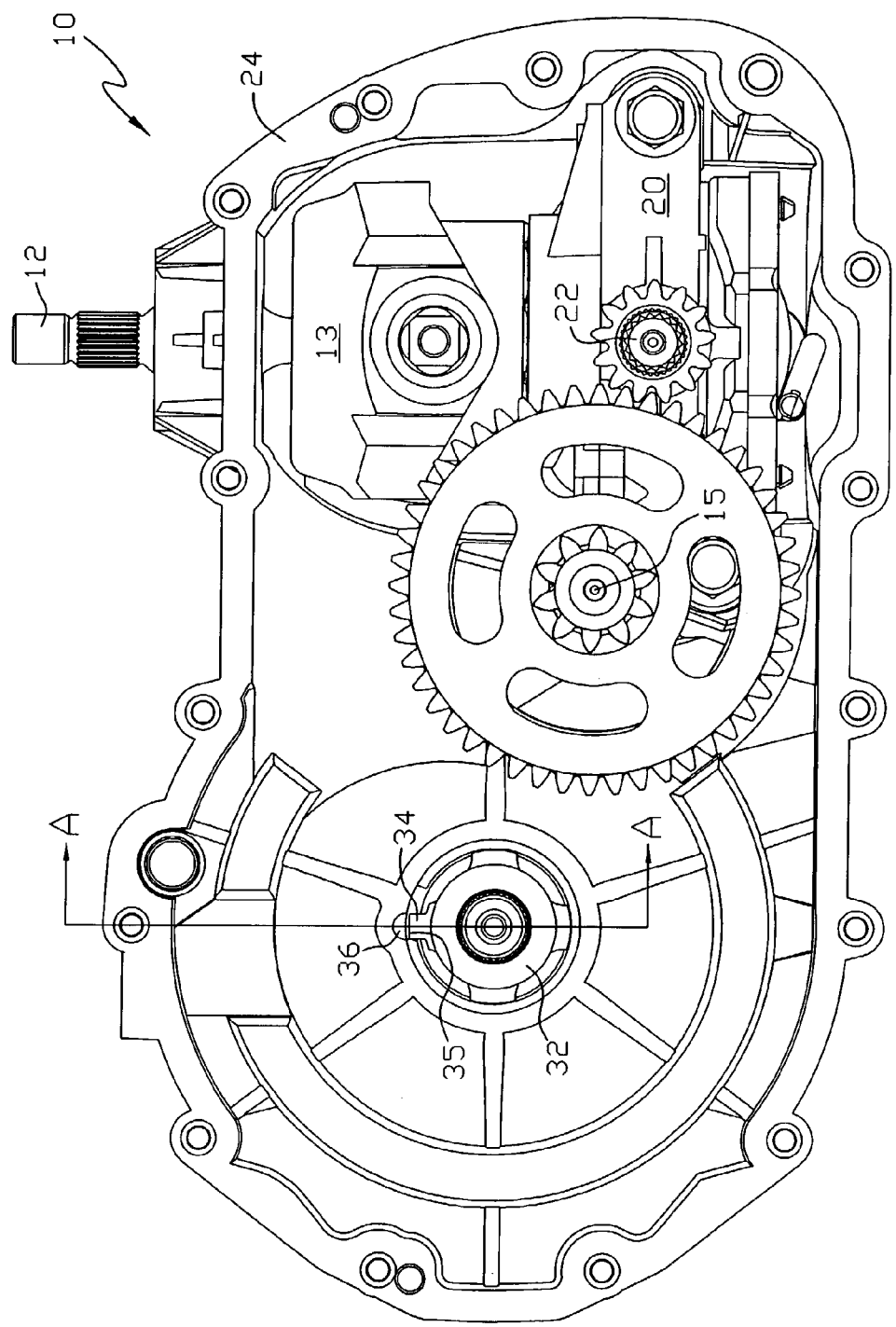
FIG. 4 is a side elevational view of the hydrostatic transaxle shown in FIG. 2, with additional elements removed for clarity.

Power is transmitted through a gear train 27 including a reduction gear shaft 15 to a differential 28, which in turn drives output axles 30. In FIG. 4, various gears and bearings are removed so that the location of the invention in this embodiment may be more clearly seen. While the switch configuration depicted herein is located on axle shaft 30 in this embodiment, it could also be located on other shafts such as motor shaft 22 or reduction gear shaft 15.

Figure 7:
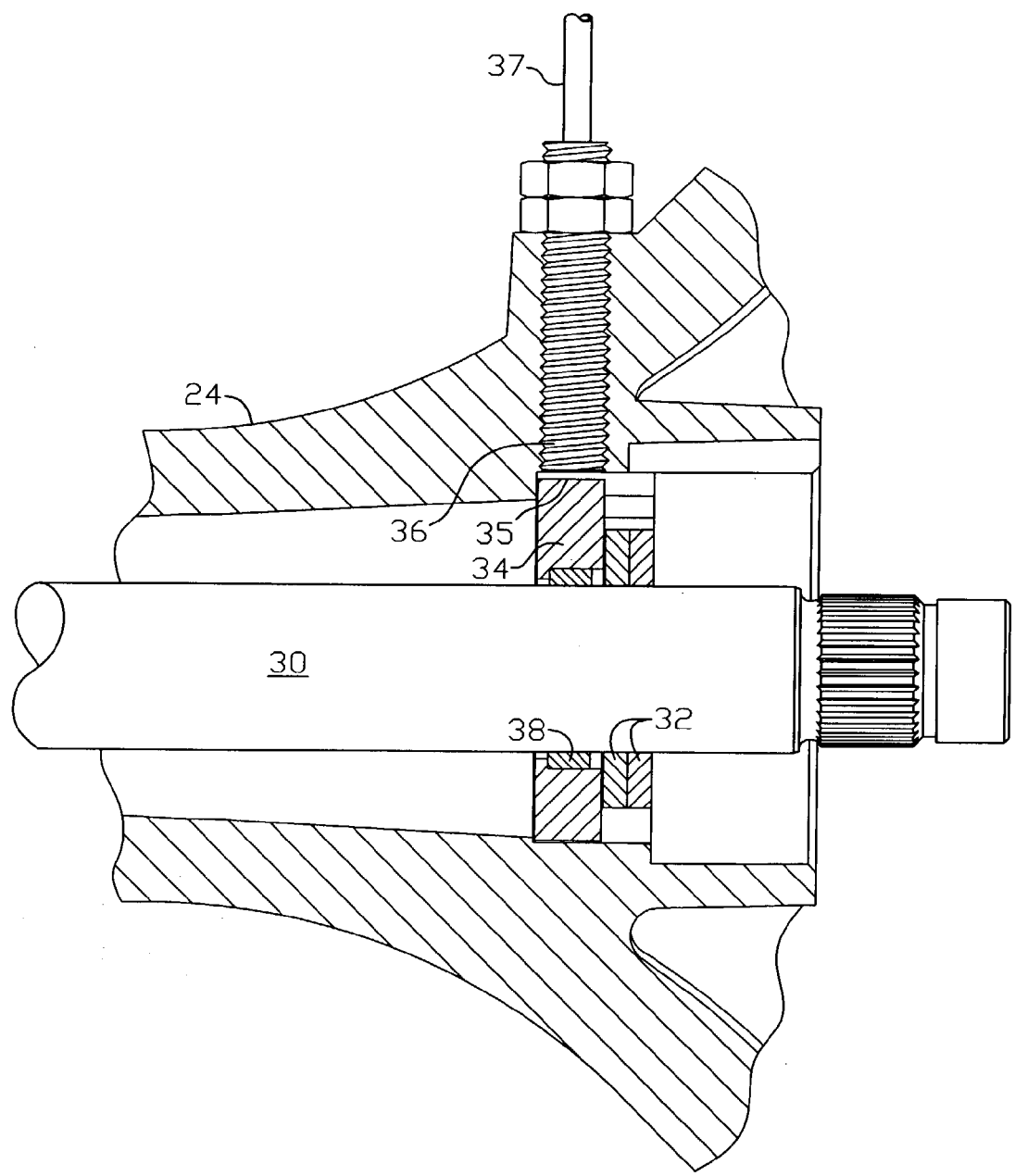
FIG. 7 is a detail cross-sectional view of an output axle and switch, along the lines A—A of FIG. 4.

FIGS. 5–7 show detail views of this first embodiment, where switch actuator 34 is mounted on axle 30 and is rotatable therewith. Washers 32 may be used to properly locate actuator 34. A sensor such as proximity switch 36 is mounted in the transaxle casing member 24 and lead 37 extends outwardly therefrom. Switch actuator 34 has a limited range of movement, as shown in FIGS. 5 and 6. Surface 40 is formed on actuator 34 and as actuator 34 rotates clockwise in these figures, which corresponds to the forward direction of axle 30, surface 40 will contact stops 44 to prevent further rotation of actuator 34. Friction means 38, which is depicted herein as a gasket, may be interposed between switch actuator 34 and axle shaft 30 to permit actuator 34 to move with respect to axle shaft 30 while being stopped with respect to casing member 24. Friction means 38 is preferably a gasket made of a material such as Nitrile or polyacrylate with a hardness of 50 to 90 durometer, although other friction devices using materials such as leather, brake pad material or the like may be used depending on the application requirements.

When axle shaft 30 moves into the reverse direction, actuator 34 is rotated into the position shown in FIGS. 5 and 7. This rotation is enhanced by the frictional force between actuator 34 and friction means 38 and between axle shaft 30 and friction means 38. Proximity switch 36 is then actuated by the proximity of surface 35 on actuator 34. As before, the rotational movement of actuator 34 is stopped by contact of surface 42 with stop 46, whereupon friction means 38 will allow movement of the axle shaft 30 relative to actuator 34.

Proximity switch 36 may be one of a variety of such switches, such as a magnetic or inductive switch. If an inductive switch is used, surface 35 needs to be metal. If a magnetic switch is used, surface 35 will need to be configured to accommodate a magnet to be located thereon.

Figure 8:
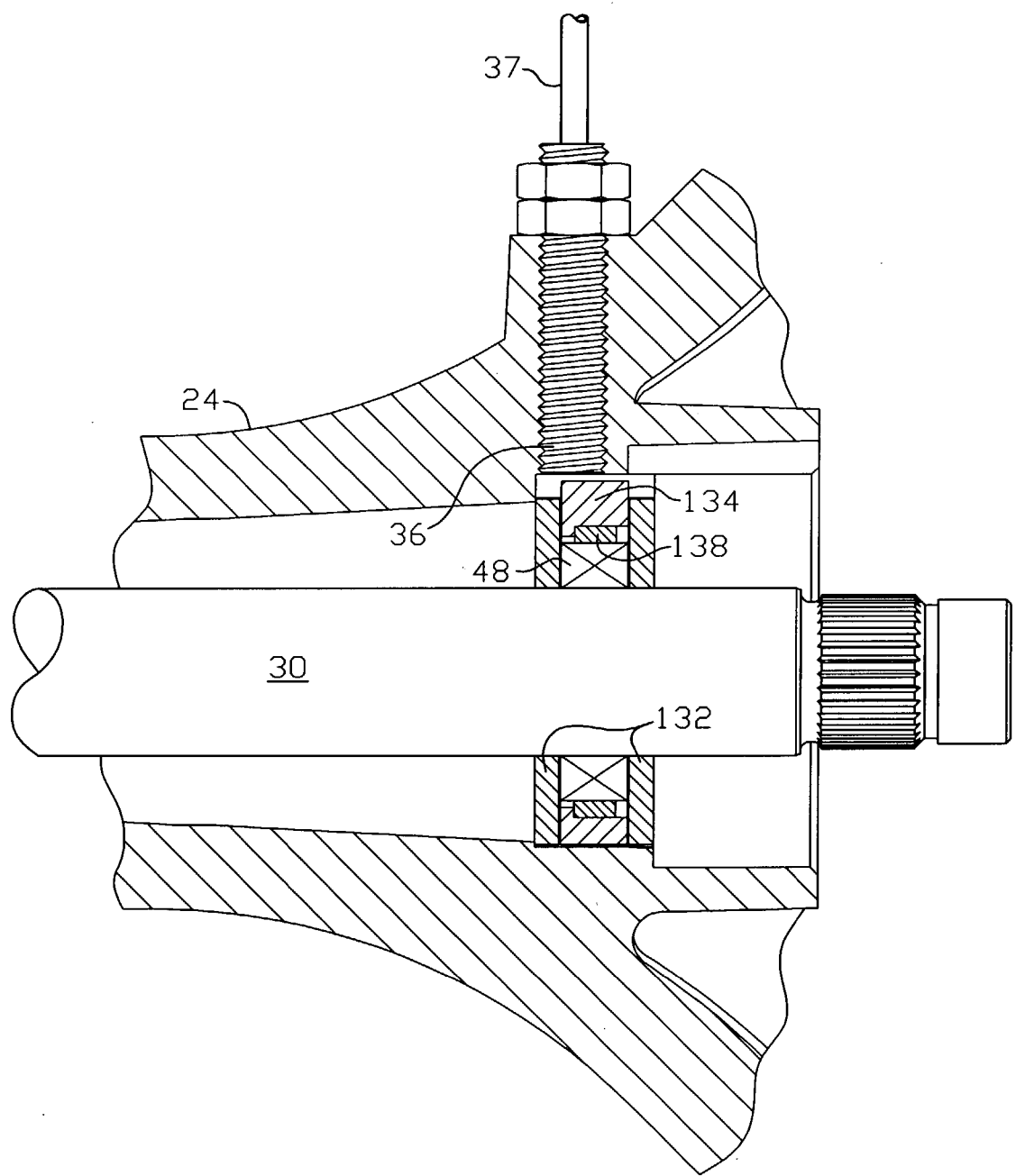
FIG. 8 is a cross-sectional view similar to that of FIG. 7 of a second embodiment of a switch in accordance with the present invention.

A second embodiment of this design is shown in FIG. 8, which includes a unidirectional bearing 48 located between actuator 134 and axle shaft 30; as in the earlier embodiment, actuator 134 acts to trigger proximity switch 36. The inner diameter of actuator 134 needs to be shaped to accommodate bearing 48, and washers 132 are used to properly locate actuator 134, with friction means 138 mounted between the outer diameter of bearing 48 and an inner diameter of actuator 134. Bearing 48 helps to reduce wear of friction means 138 because bearing 48 rotates relatively easily against axle shaft 30 when actuator 134 contacts the forward stop in casing member 24, and the frictional force between unidirectional bearing 48 and actuator 134 caused by contact with friction means 138 will hold unidirectional bearing 48 fixed with respect to actuator 134. When axle shaft 30 rotates in reverse, bearing 48 locks against axle shaft 30 and rotates therewith. When actuator 134 hits a stop, friction means 138 allows actuator 134 to remain fixed while axle shaft 30 and bearing 48 rotate.

It is preferred to use proximity switches as described above so that the switch can be actuated with the minimum force possible, due to the limited resistance to movement of the gasket interface. Proximity switches are also long-lived, which can be an important benefit depending on the application. However, such proximity switches can also be expensive and in certain applications it may be preferred to use a less expensive alternative.

Figure 9:
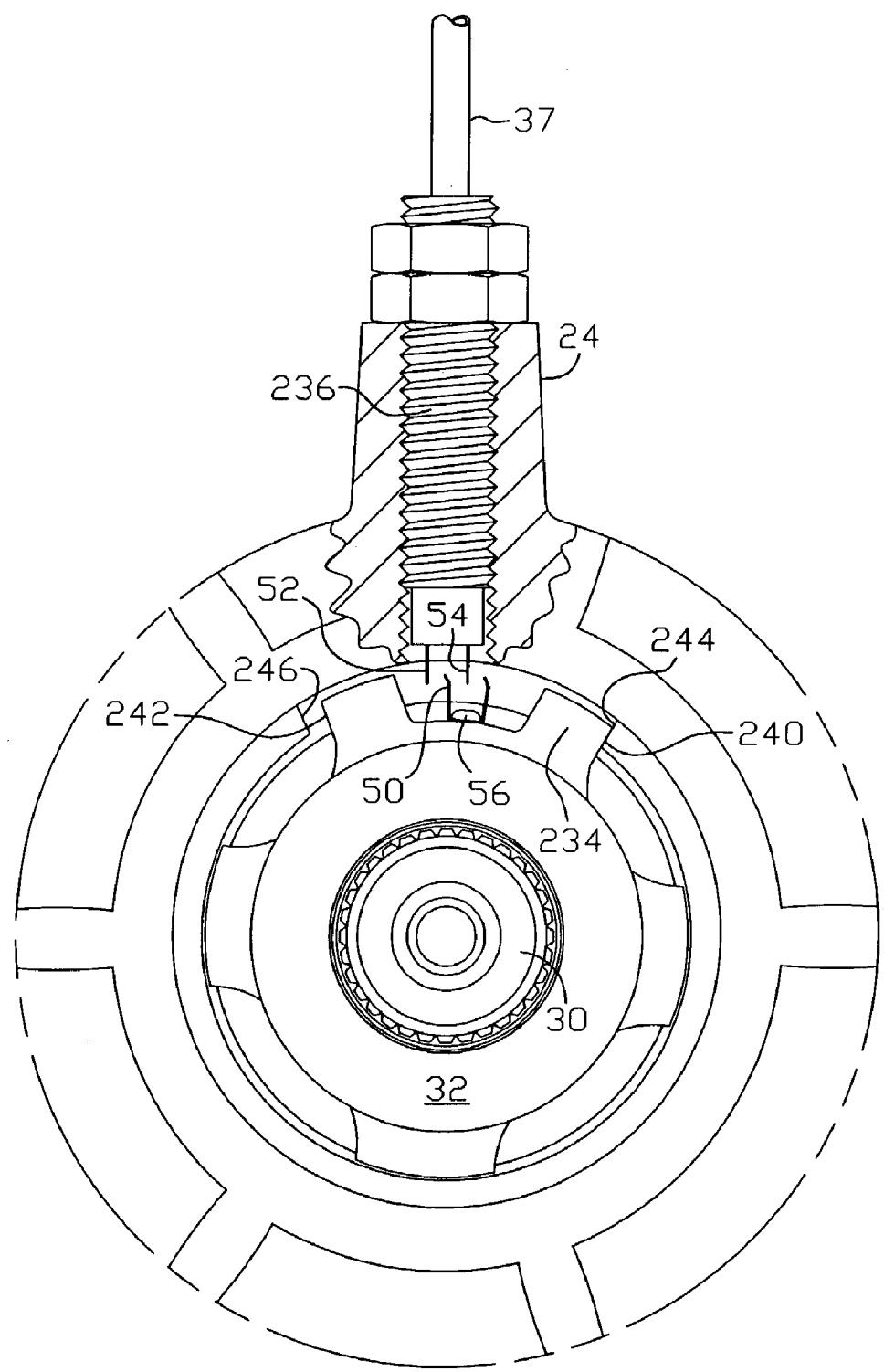
FIG. 9 shows a detail view of another embodiment of a switch in accordance with the present invention, with the switch in the "off" or "open" position.

One such alternative is shown in FIG. 9, where a mechanical switch 236 is used as the sensor. Specifically, mechanical switch 236 has two contacts 52 and 54 mounted therein and extending downwardly therefrom towards actuator 234. Actuator 234 is composed of an electrically non-conducting material. A generally U-shaped metal contact 50 is fastened to actuator 234 by means of fastener 56. When axle shaft 30 rotates into the forward position (as shown in FIG. 9), surface 240 will contact stop 244, and contact 50 will not contact any conducting elements. When axle shaft 30 rotates in the opposite, or reverse, direction, surface 242 will engage stop 246 so that the two flexible arms of contact 50 simultaneously touch contacts 52 and 54 to close an electrical circuit, closing switch 236, thus indicating that axle shaft 30 has rotated in the reverse direction.

Figure 11:
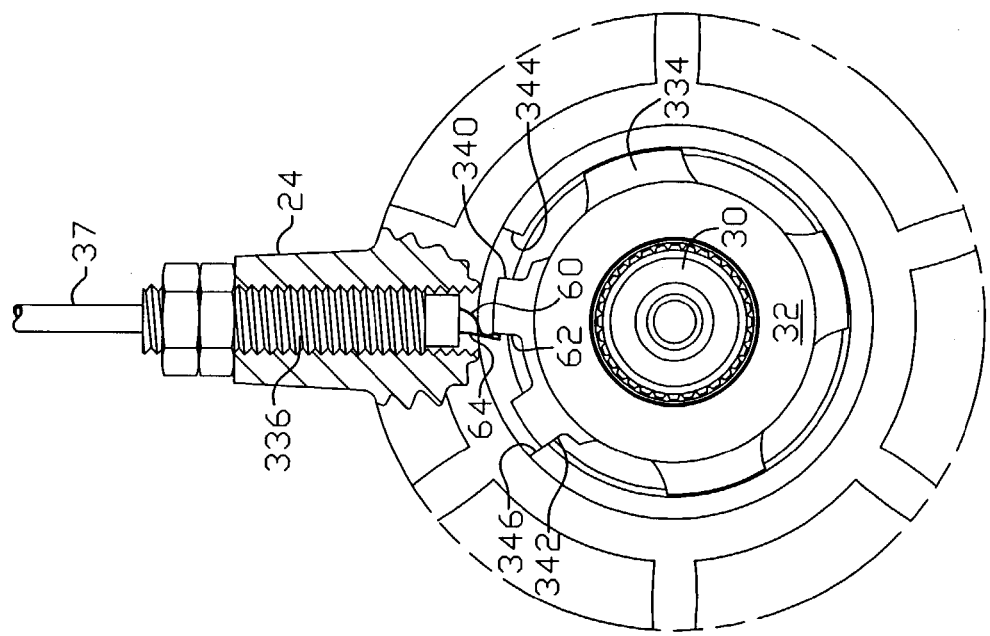
FIG. 11 shows a detail view of the switch shown in FIG. 10, with the switch in the "on" or closed position.
Figure 10:
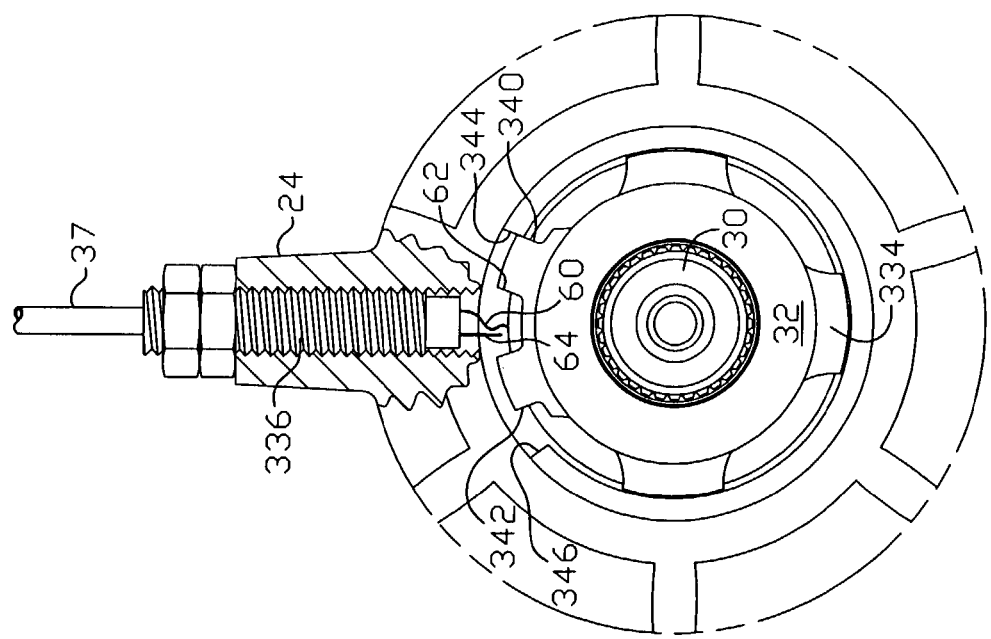
FIG. 10 shows a detail view of another embodiment of a switch in accordance with the present invention, with the switch in the "off" or "open" position.

A fourth embodiment, which is similar in many aspects to the embodiment shown in FIG. 9, is shown in FIGS. 10 and 11. Switch 336 includes a pair of contacts 60 and 64 extending downwardly therefrom. Contact 60 is flexible and is shaped to move in and out of contact with contact 64. Contact 60 preferably has a flexibility which is significantly less than the force required to permit relative rotation between actuator 334 and axle shaft 30 by slippage of the friction means in the interface between axle shaft 30 and the actuator 334. As can be seen in FIG. 10, when axle shaft 30 rotates into the forward position, surface 340 of actuator 334 moves into contact with stop 344, and contacts 60 and 64 do not touch. When axle shaft 30 moves in the reverse direction, surface 62 of actuator 334 will push contact 60 into contact 64, completing an electrical circuit and thus closing switch 336. Movement of actuator 334 in the reverse direction is limited by the interaction of surface 342 on actuator 334 with stop 346, to limit the potential of damage to flexible contact 60. It will be understood that in this embodiment as well as the other embodiments discussed herein that the shape and location of the various actuator surfaces and stops that interact to limit rotational movement of the actuators may be modified to fit the application.

Figure 12:
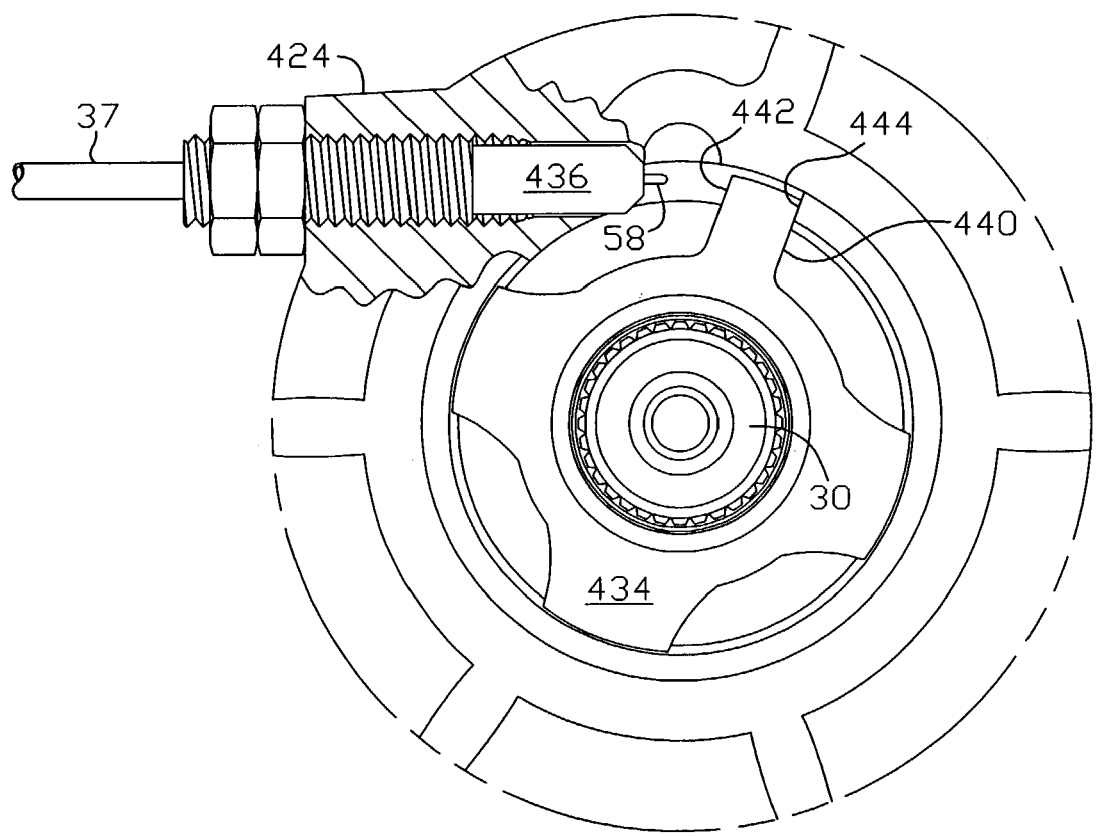
FIG. 12 is a detail view of a switch in accordance with a fifth embodiment of this invention.

Other means of stopping rotation of the actuator and/or actuating the switch will be obvious to one of skill in the art. By way of example, a fifth embodiment is shown in FIG. 12, where a low actuation force switch plunger 58 is mounted in switch body 436. Rotation of axle shaft 30 in the forward direction moves actuator 434 to the position shown in FIG. 12, where surface 440 contacts stop 444 to limit the forward rotation of actuator 434. When axle 30 rotates in the reverse direction, surface 442 contacts plunger 58, which both triggers switch 436 and limits further rotation of actuator 434.

Figure 13:
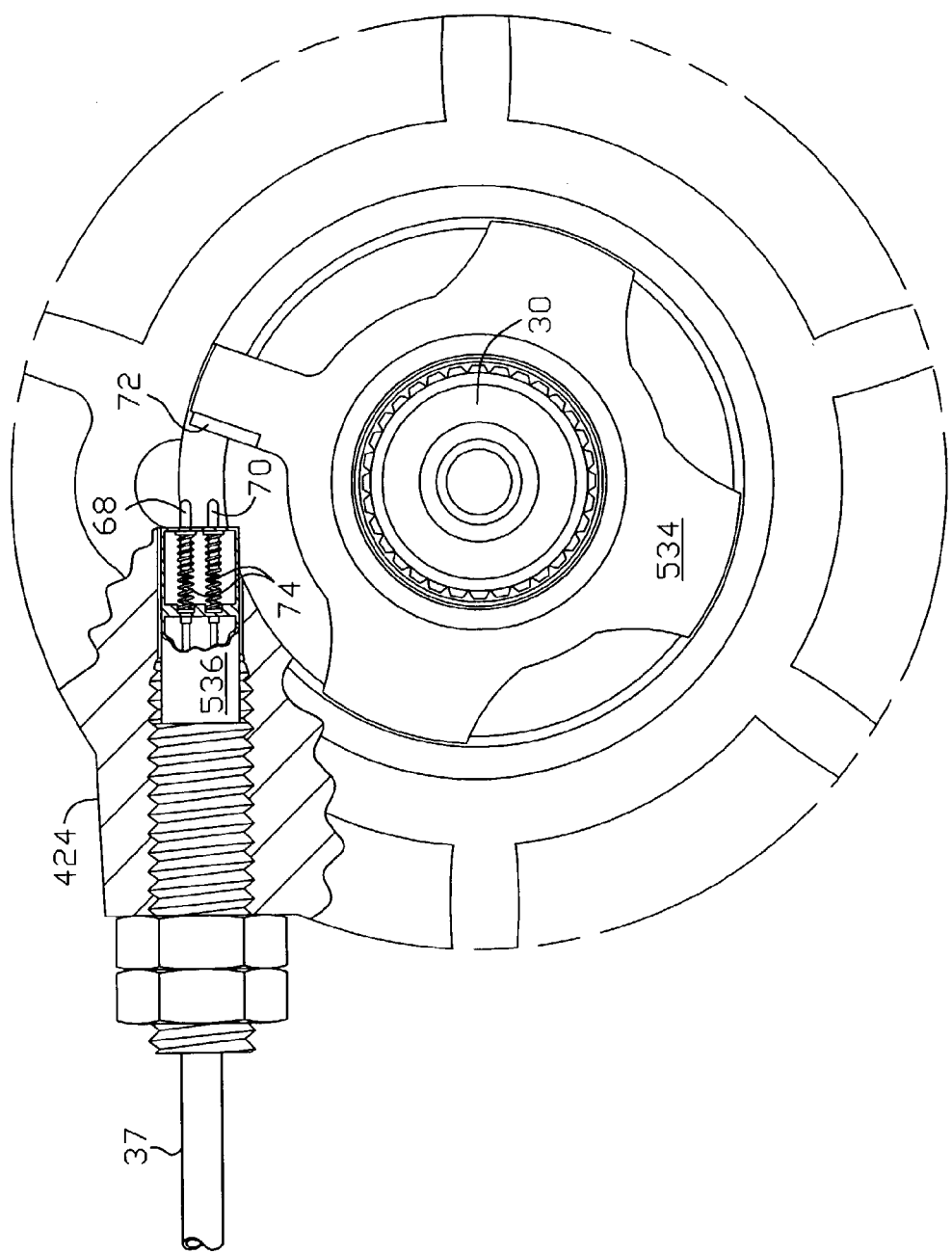
FIG. 13 is a detail, partial cross-sectional view of a switch in accordance with a sixth embodiment of this invention.

A sixth embodiment is shown in FIG. 13 which is very similar in operation to that shown in FIG. 12. Switch 536 includes a pair of contacts 68 and 70 which are spring loaded with low force springs 74. Rotatable actuator 534 is composed of a non-conductive material such as plastic. Its rotational movement is limited in a manner similar to that described above with respect to FIG. 12. Actuator 534 includes metal contact or pad 72 placed thereon in a manner and location such that when actuator 534 rotates in the reverse direction, pad 72 contacts both contacts 68 and 70 to close the electrical circuit and trigger the switch as described above.

Figure 14:
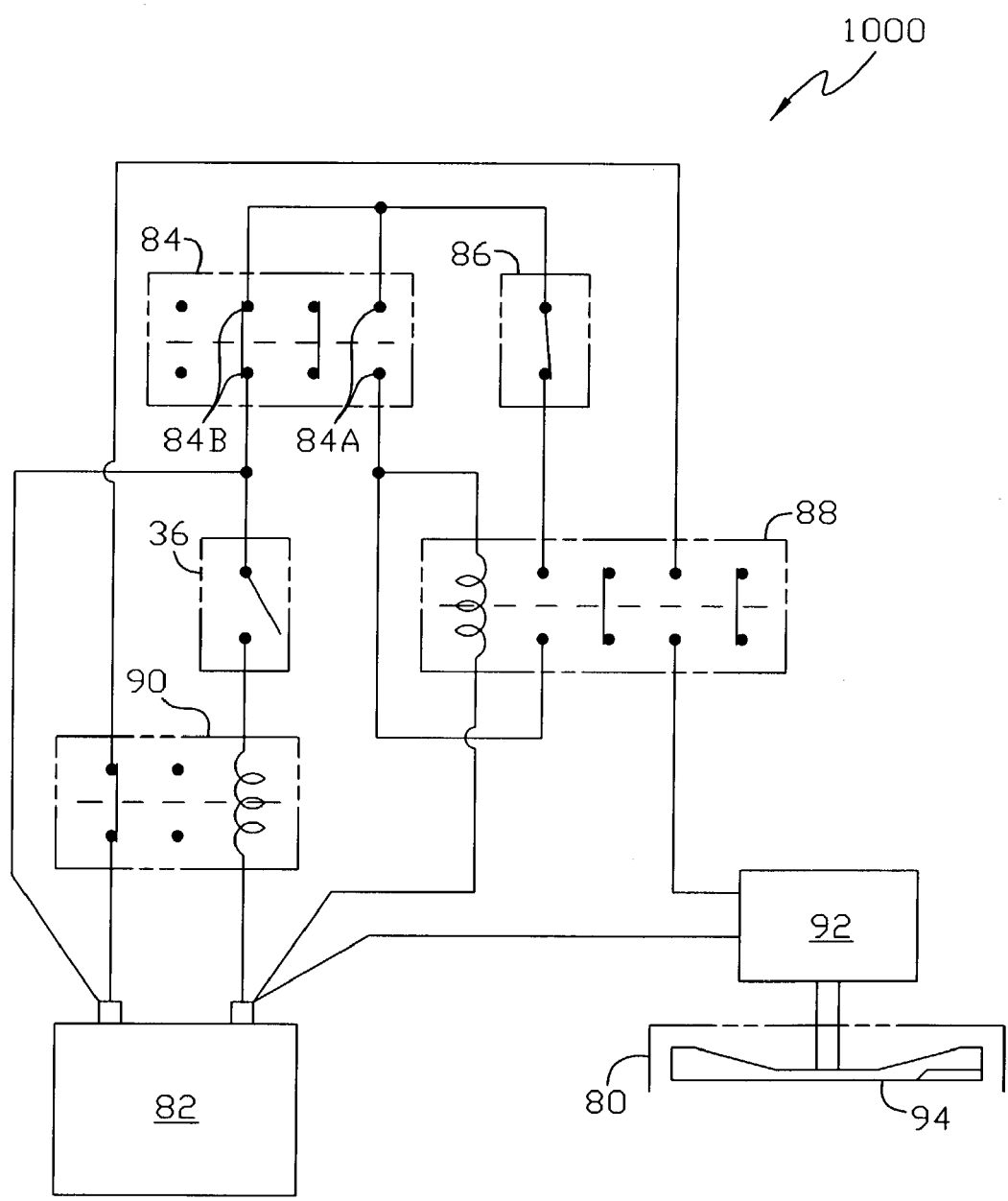
FIG. 14 is a schematic of an electric circuit in accordance with the present invention.

FIG. 14 is a schematic circuit diagram 1000 of a reverse blade cutoff switch constructed according to one embodiment of the present invention. Any of the proximity switches described above, such as switch 36, is coupled between a blade momentary switch 84 and a relay 90 as shown in diagram 1000. When the operator wishes to stop operation of the mower blades 94, momentary switch 84 may be depressed so that contacts 84B in switch 84 are no longer connected, which then causes latching relay 88 to be released or deactivated. The purpose and functionality of momentary switch 84 is described in greater detail below. The latching relay 88 is coupled to a blade clutch 92 which controls blades 94 in mower deck 80. A battery 82 is coupled to several nodes in the circuit, as shown FIG. 14.

In FIG. 14, a brake switch 86 is coupled between blade momentary switch 84 and latching relay 88 as shown in the circuit diagram 1000. Brake switch 86 is beneficial in hydrostatic transaxle applications where the primary means of braking the transaxle is the hydraulic braking that occurs as the swash plate nears neutral. In these embodiments, brake switch 86 is included to cause release of latching relay 88 in the event the brake is actuated, which is seen as an operational advantage in that the conditions that would cause the actuation of a brake in a hydrostatic application would also likely benefit from blades 94 being disengaged. In other embodiments involving transaxles where the primary means of braking is a dynamic brake, brake switch 86 may not be desired and can be omitted such that blade momentary switch 84 is coupled directly to latching relay 88. Another option may be to include switch 86 as a part of the parking brake function of such transaxles. As with a hydrostatic transaxle, the operational benefit is that any condition which requires activation of the parking brake would likely benefit from disengagement of the blades 94.

Figure 15:
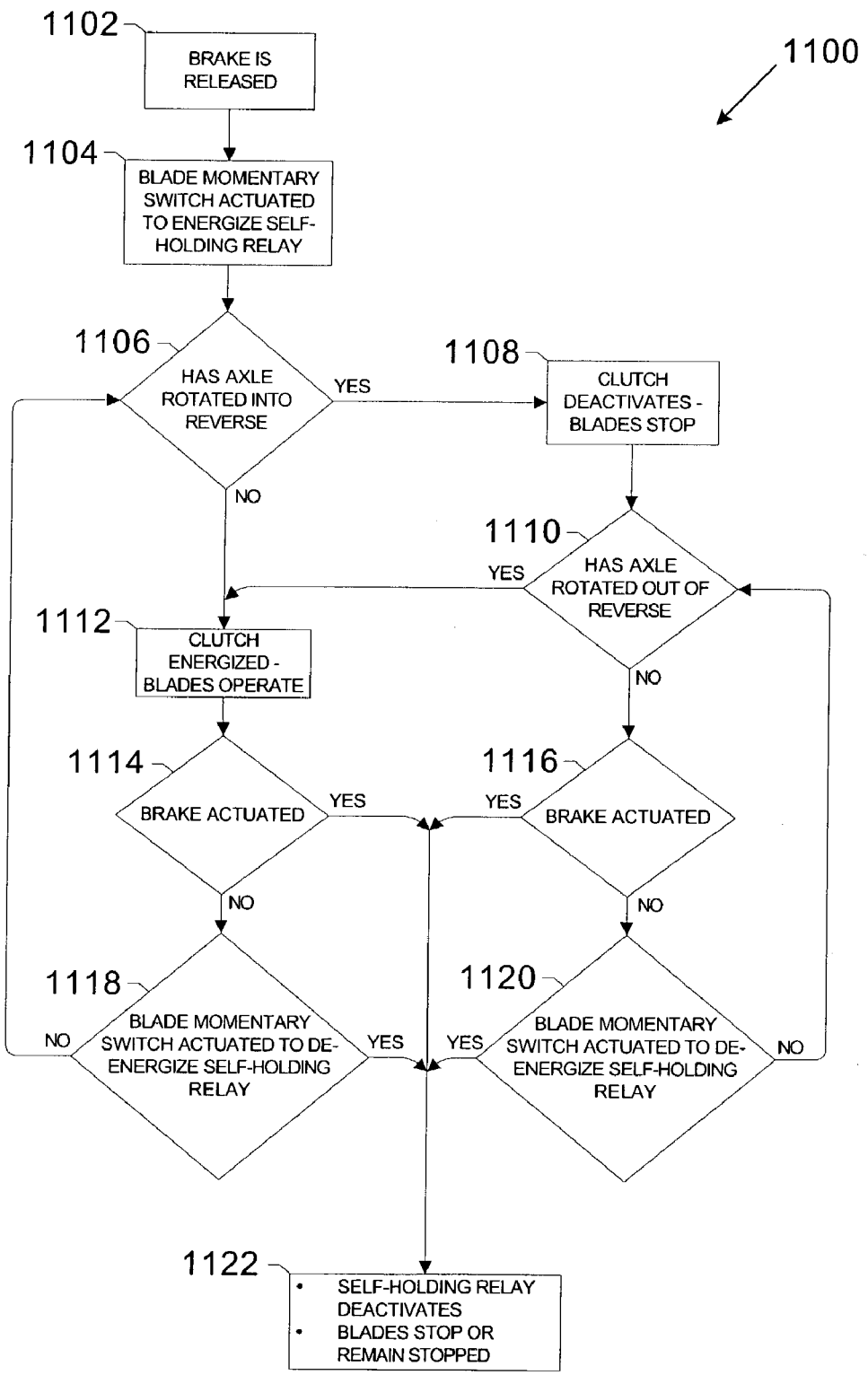
FIG. 15 is a flow chart of the schematic shown in FIG. 14.

FIG. 15 is a flow diagram 1100 which shows the functionality of the circuit of FIG. 14. In step 1102, when the operator releases the brake, the brake switch 86 is closed. Continuing with step 1104, the blade momentary switch 84 is actuated so that contacts 84A allow a voltage signal to reach and actuate latching relay 88, also referred to herein as a self-holding relay. The process proceeds to step 1106 in which it is determined whether the axle shaft has rotated in reverse. When the axle shaft rotates in reverse, in step 1108, switch 36 is closed, causing relay 90 to actuate, removing voltage from blade clutch 92, causing blades 94 to be disengaged. To this end, blade clutch 92 preferably includes a brake to stop movement of the disengaged blades 94.

In FIG. 15, after the blades 94 are disengaged in step 1108, it is determined in step 1110 whether the axle has rotated out of reverse. In step 1110 or 1106, when the axle has rotated out of reverse, switch 36 responds by opening in step 1112 to deactivate relay 90, such that voltage is returned to blade clutch 92 to engage blades 94. In step 1110, if the axle has still not rotated out of reverse, control proceeds to step 1116. In steps 1114 and 1116, when the brake is actuated, the process proceeds to step 1122 in which brake switch 86 opens, causing release of latching relay 88 thus removing power from clutch 92 to stop the blades 94. In steps 1114 and 1116, when the brake is not actuated, the process continues to steps 1118 and 1120 to determine whether the blade momentary switch 84 has been actuated by the operator to de-energize the self-holding relay. When momentary switch 84 has been depressed, in step 1122 latching relay 88 is deactivated, thus removing power from clutch 92 to stop the blades 94. When the blade momentary switch has not been depressed, control returns to step 1106 or 1110 to again determine whether the axle is rotating in the reverse direction.

Figure 16:
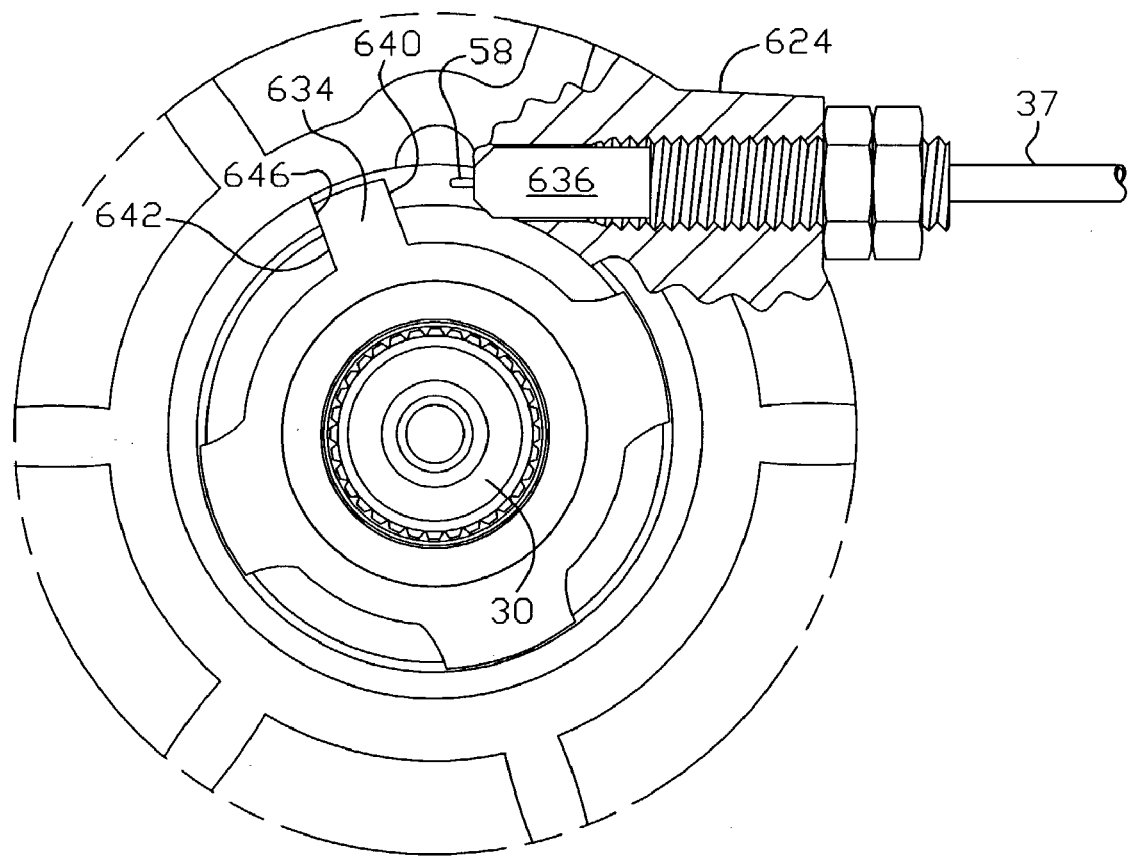
FIG. 16 is a detail, partial cross-sectional view of a switch in accordance with a seventh embodiment of this invention, where the switch is triggered in the forward instead of the reverse directions.

FIG. 16 shows a seventh embodiment of this invention where the switch 636 is triggered when axle 30 is rotated in the forward direction as opposed to the reverse direction. This embodiment is otherwise identical to that shown in FIG. 12 and the same description therein will apply. Specifically, rotation of axle 30 in the forward direction would cause surface 640 to contact plunger 58 to close switch 636. Rotation of actuator 634 in the reverse direction is limited by the interaction of surface 642 with stop 646.

Figure 17:
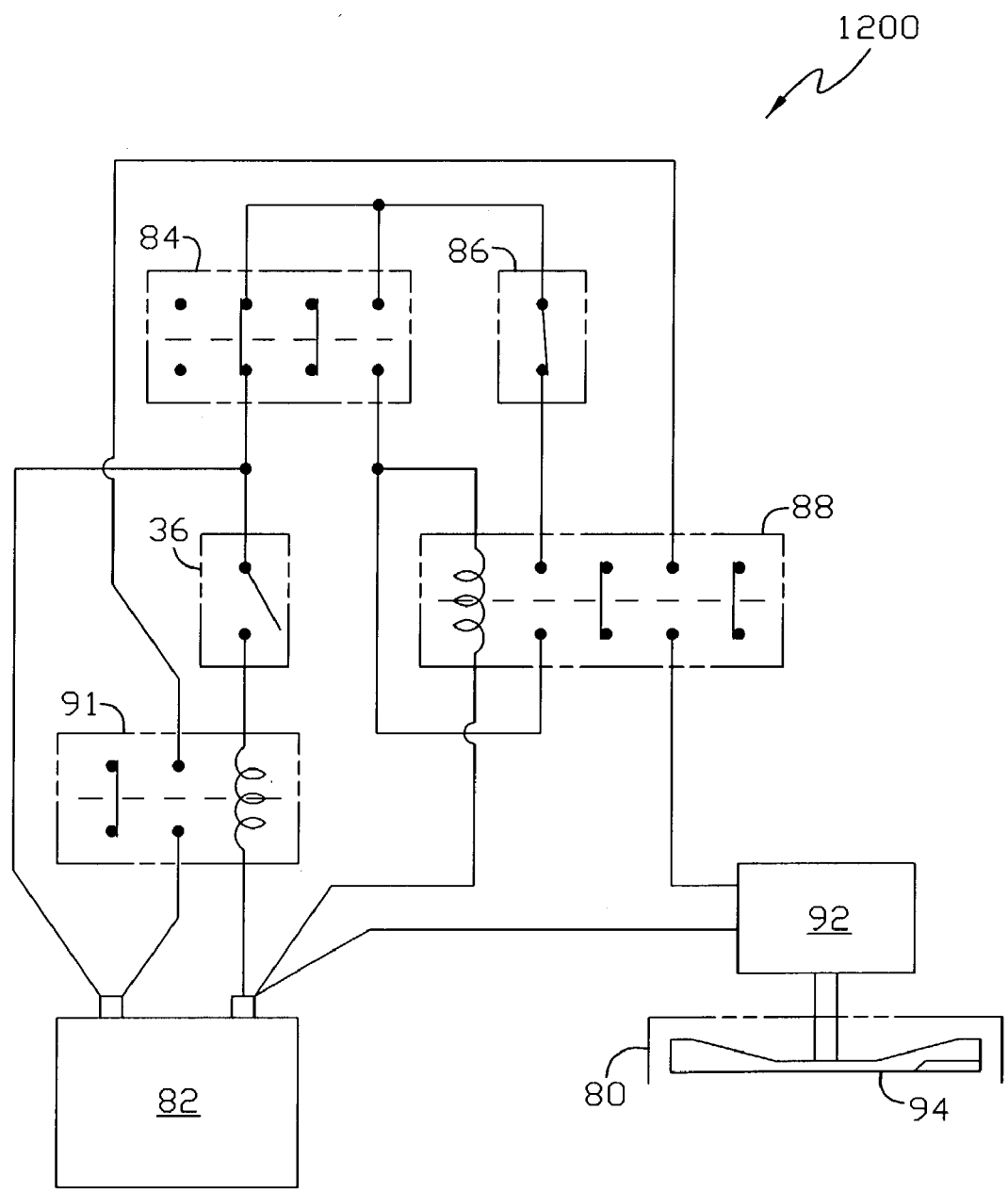
FIG. 17 is a schematic view of the electric circuit of the seventh embodiment of the invention shown in FIG. 16.

FIG. 17 is a schematic circuit diagram 1200 of a reverse blade cutoff switch constructed according to the seventh embodiment of the present invention. The circuit of FIG. 17 corresponds to the embodiment of FIG. 16, where the switch is triggered in the forward instead of the reverse direction. The circuit diagram 1200 of FIG. 7 is nearly identical to that of FIG. 14; the difference is that relay 91 of diagram 1200 replaces relay 90 of diagram 1000, and relay 91 is wired as illustrated in FIG. 17 such that relay 91 is activated when the axle moves into the forward position rather than the reverse position. The configuration of FIG. 17 provides the advantage that if the circuit fails, the blades 94 will not be activated, or if activated, they will be deactivated.

Figure 18:
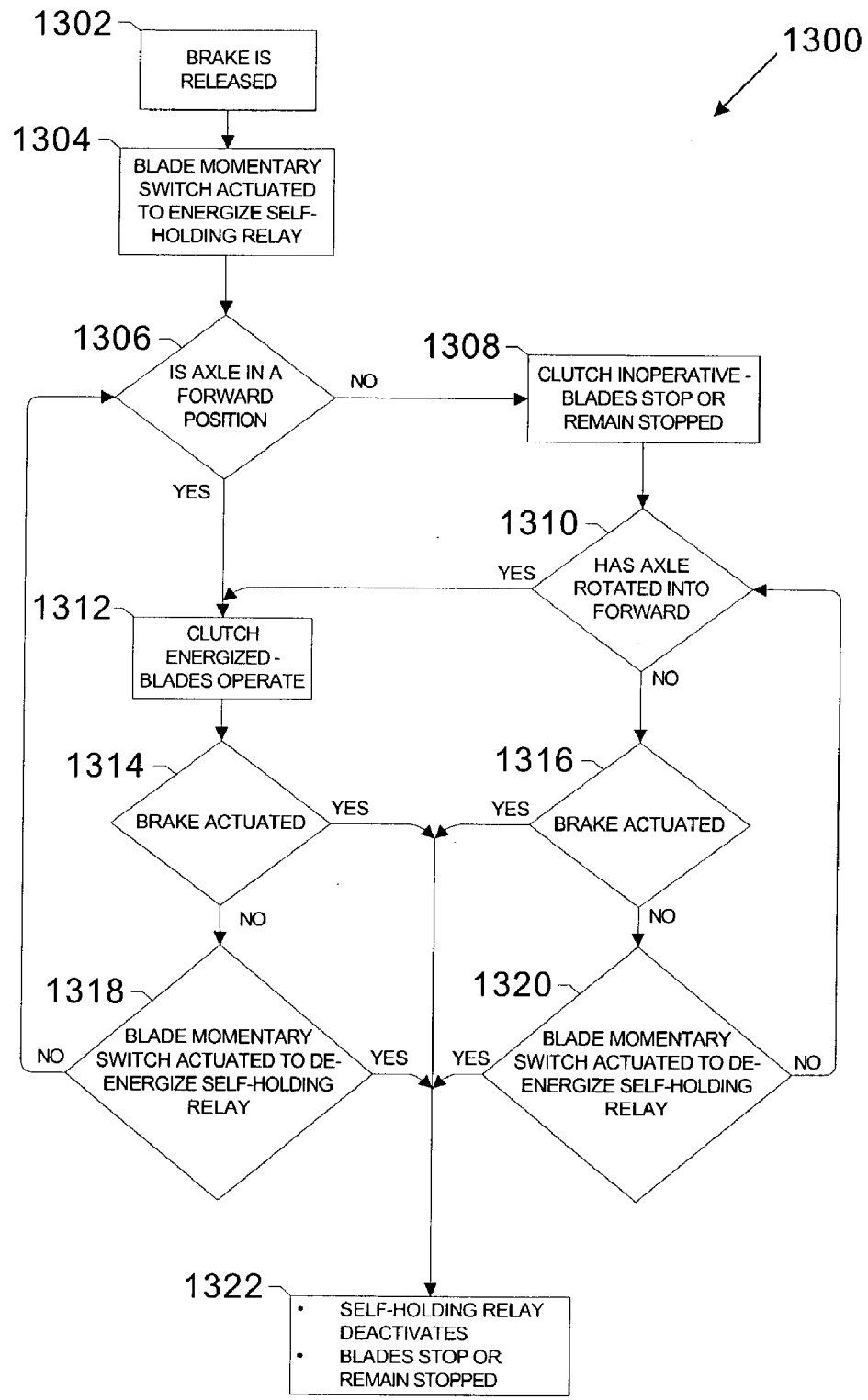
FIG. 18 is a flowchart of the embodiments shown in FIGS. 16 and 17.

FIG. 18 is a flow diagram 1300 which shows the functionality of the circuit of FIG. 17. In step 1302, the brake is released such that brake switch 86 is closed. In step 1304, the blade momentary switch 84 is actuated to energize the self-holding relay, that is, latching relay 88 in FIG. 17. The process proceeds to step 1306 in which it is determined whether the axle is in a forward, rather than a reverse, position. When the axle shaft is not rotating forward, in step 1308, switch 36 is open and clutch 92 is inoperative such that blades 94 are stopped or remain stopped. After step 1308, it is again determined in step 1310 whether the axle has rotated in a forward direction. In step 1310 or 1306, when the axle has rotated forward, closing switch 36, control proceeds to step 1312 in which relay 91 is actuated, causing clutch 92 to be energized so that blades 94 operate. In step 1310, if the axle has still not rotated forward, control proceeds to step 1316.

In steps 1314 and 1316 of FIG. 18, when the brake is actuated, the brake switch 86 opens to remove voltage from latching relay 88, in step 1322, thus removing power from clutch 92 to stop the blades 94 or to keep blades 94 stopped. In steps 1314 and 1316, when the brake is not actuated, control proceeds to steps 1318 and 1320 to determine whether the blade momentary switch 84 has been actuated by the operator to de-energize the self-holding relay. When momentary switch 84 has been actuated, control proceeds to step 1322 in which latching relay 88 is deactivated, thus removing power from clutch 92 to stop the blades 94 or to keep blades 94 stopped. If the blade momentary switch is not actuated, control returns to step 1306 or 1310 to again determine whether the axle is rotating in the forward direction.

Figure 19:
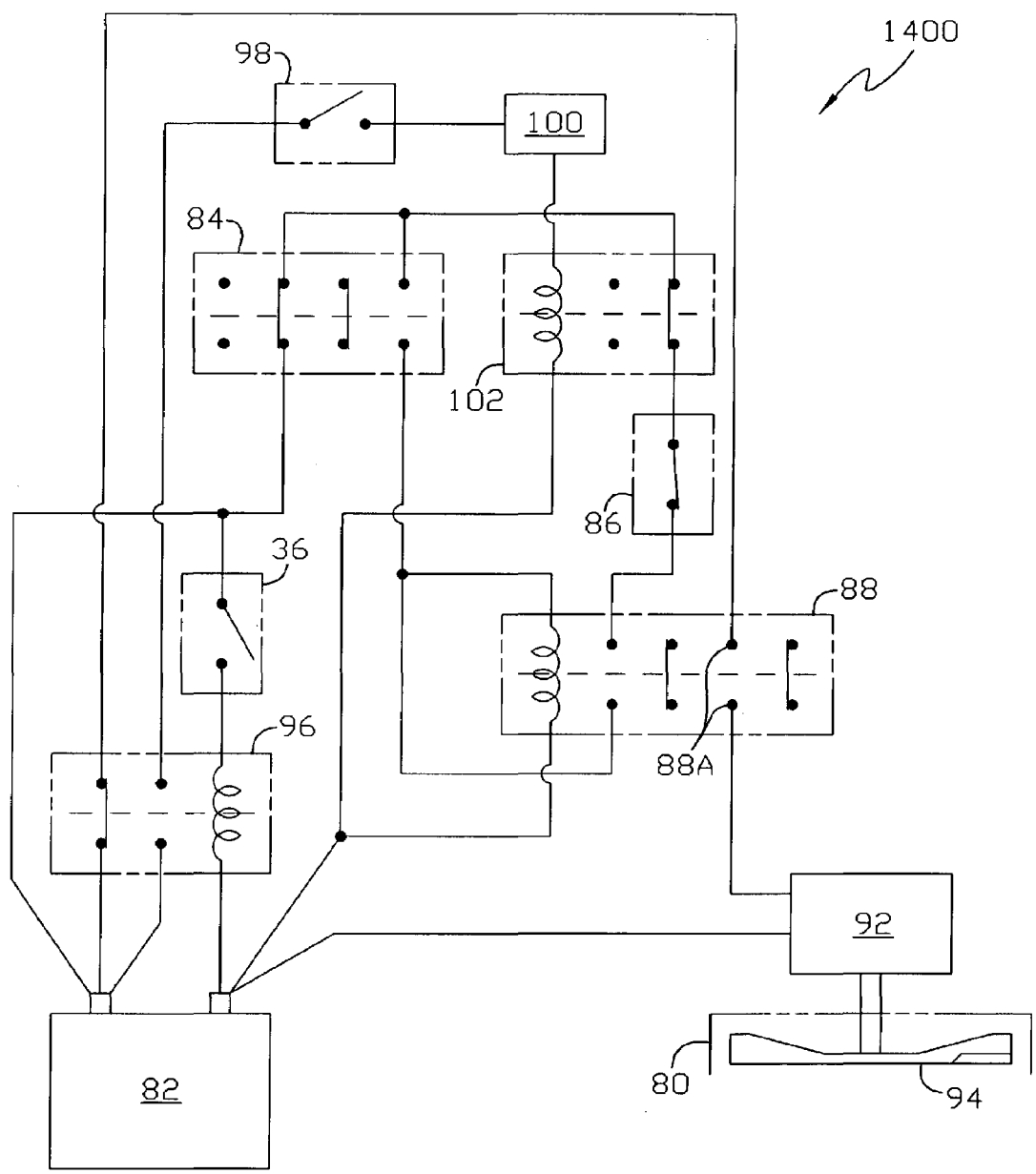
FIG. 19 is a schematic of an electric circuit in accordance with another embodiment of this invention.

FIG. 19 is a schematic circuit diagram 1400 showing another embodiment of a reverse blade cutoff switch constructed according to the present invention. The circuit of FIG. 19 incorporates several of the circuit elements of FIGS. 14 and 17. In addition, the circuit of FIG. 19 includes a time delay circuit 100, a relay 102, a handle switch 98, and a relay 96 in place of relays 90 and 91.

Figure 20:
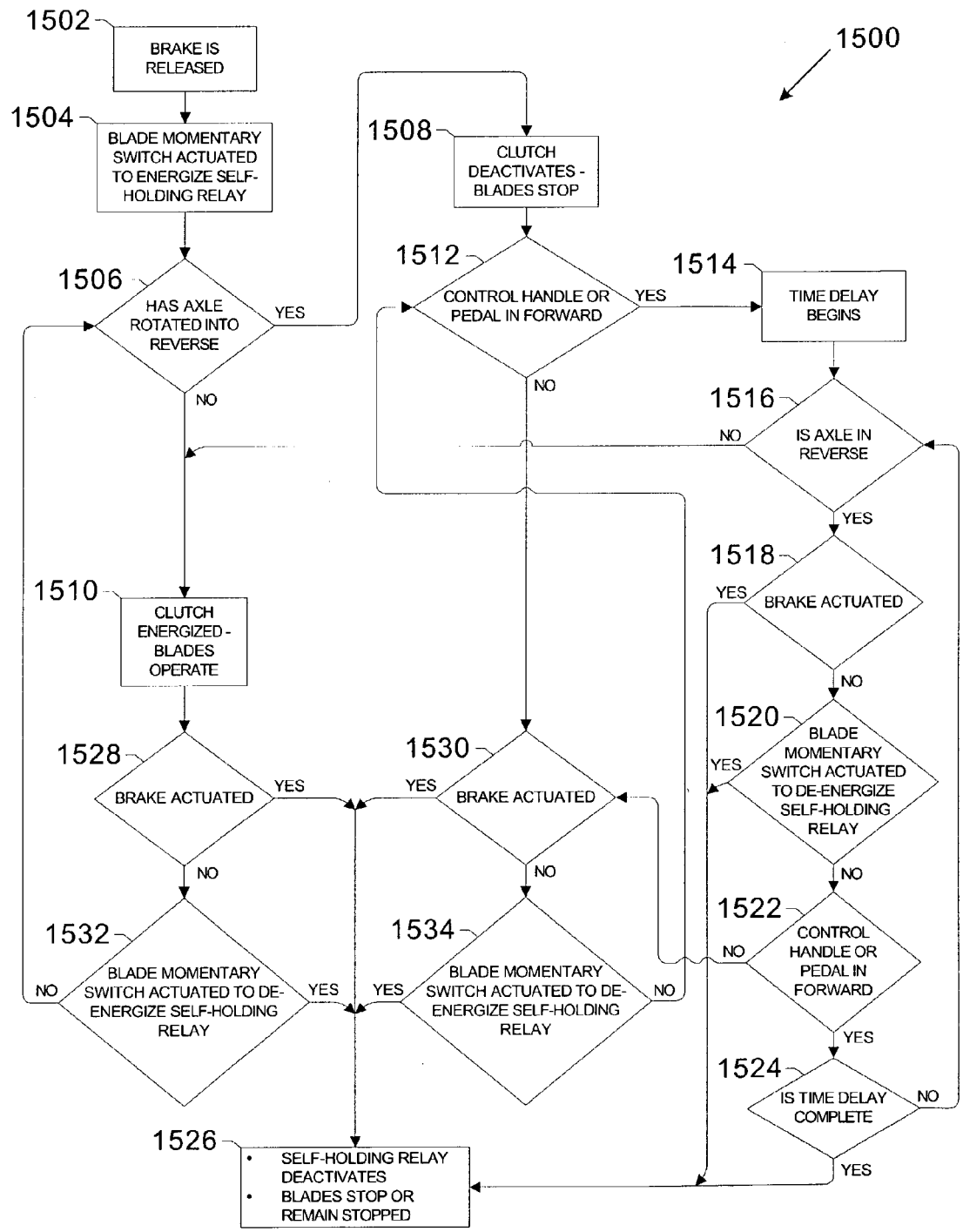
FIG. 20 is a flowchart of the embodiment depicted in the schematic shown in FIG. 19.

FIG. 20 shows a flow diagram 1500 which demonstrates the functionality of circuit 1400. In step 1502, the brake is released so that brake switch 86 is closed. In step 1504, blade momentary switch 84 is actuated so that latching relay 88 is energized. In step 1506, it is determined whether the axle has rotated in reverse. When the axle shaft rotates in reverse, in step 1508, switch 36 is closed, activating relay 96. Activation of relay 96 removes voltage from contacts 88A of latching relay 88, thereby removing power from clutch 92, causing blades 94 to stop. In step 1506, when the axle has not rotated in to reverse, the switch 36 remains open. Thus, in step 1510, clutch 92 remains energized so that blades 94 can operate.

In steps 1512 and 1514 of FIG. 20, when the control handle or pedal of the vehicle is in a position inconsistent with the direction of axle shaft 30 rotation, such as forward or neutral while axle shaft 30 is in the reverse position, switch 36 and handle switch 98 will be closed. Voltage will be applied through time delay circuit 100, which will then actuate relay 102 if axle shaft 30 has not rotated out of reverse during the time delay, which will then cause deactivation of latching relay 88. Thus, if the operator wishes to continue mowing when such a condition occurs, the operator will need to cause axle 30 to rotate out of reverse and then actuate momentary switch 84 again to reengage the mower blades. This configuration thus provides an additional safety feature for mowing.

In FIGS. 19 and 20, given that switch 36 may be closed while shifting into a forward position, and it may take some period of time for switch 36 to open, the resulting need to reengage momentary switch 84 for routine operations such as forward and reverse maneuvering would be an annoyance for most operators. Thus, time delay circuit 100 is provided to allow time for switch 36 to become open during a shift from reverse to forward. While the range of time may be chosen as desired, based on the expected application, the preferred time delay is between 2 and 4 seconds. After this predetermined time delay, if switch 36 remains closed and handle switch 98 remains closed, then latching relay 88 will de-activate, requiring the operator to reengage switch 84 to continue mowing.

In FIG. 20, the time delay provided by delay circuit 100 begins in step 1514. During the delay period, control proceeds through a sequence of steps 1516–1524. In step 1516, it is determined whether the axle remains in reverse. When the axle is not in reverse, control proceeds to step 1510 described above. When the axle is in the reverse position, control proceeds to step 1518 to determine the status of the brake. When the brake has been actuated, brake switch 86 opens to cause deactivation of latching relay 88, in step 1526, thus removing power from clutch 92 to stop the blades 94. In step 1518, when the brake is not actuated, control proceeds to step 1520 to determine whether the blade momentary switch 84 has been actuated by the operator. When momentary switch 84 has been actuated, control proceeds to step 1526. When the blade momentary switch is not actuated, control proceeds to step 1522 to again determine whether the control handle or pedal is in an inconsistent position such as forward or neutral. If the control handle or pedal has been returned to reverse, then control proceeds to step 1530, which functions as described in the next paragraph. When in the forward position, in step 1524, it is determined whether the pre-determined time of delay circuit 100 has expired. If this delay period has not expired, control returns to step 1516 to repeat steps 1516–1524. In step 1524, when the time delay has expired, control proceeds to step 1526.

In steps 1528 and 1530 of FIG. 20, when the brake is actuated, control proceeds to step 1526. When the brake is not actuated, control proceeds to step 1532 or 1534 to determine whether the blade momentary switch 84 has been actuated by the operator. When the blade momentary switch is not actuated, control returns to step 1506 from step 1532, and to step 1512 from step 1534. In steps 1532 and 1534, when the blade momentary switch 84 is actuated to de-energize the latching relay 88, the blades 94 stop or remain stopped in step 1526.

Figure 21:
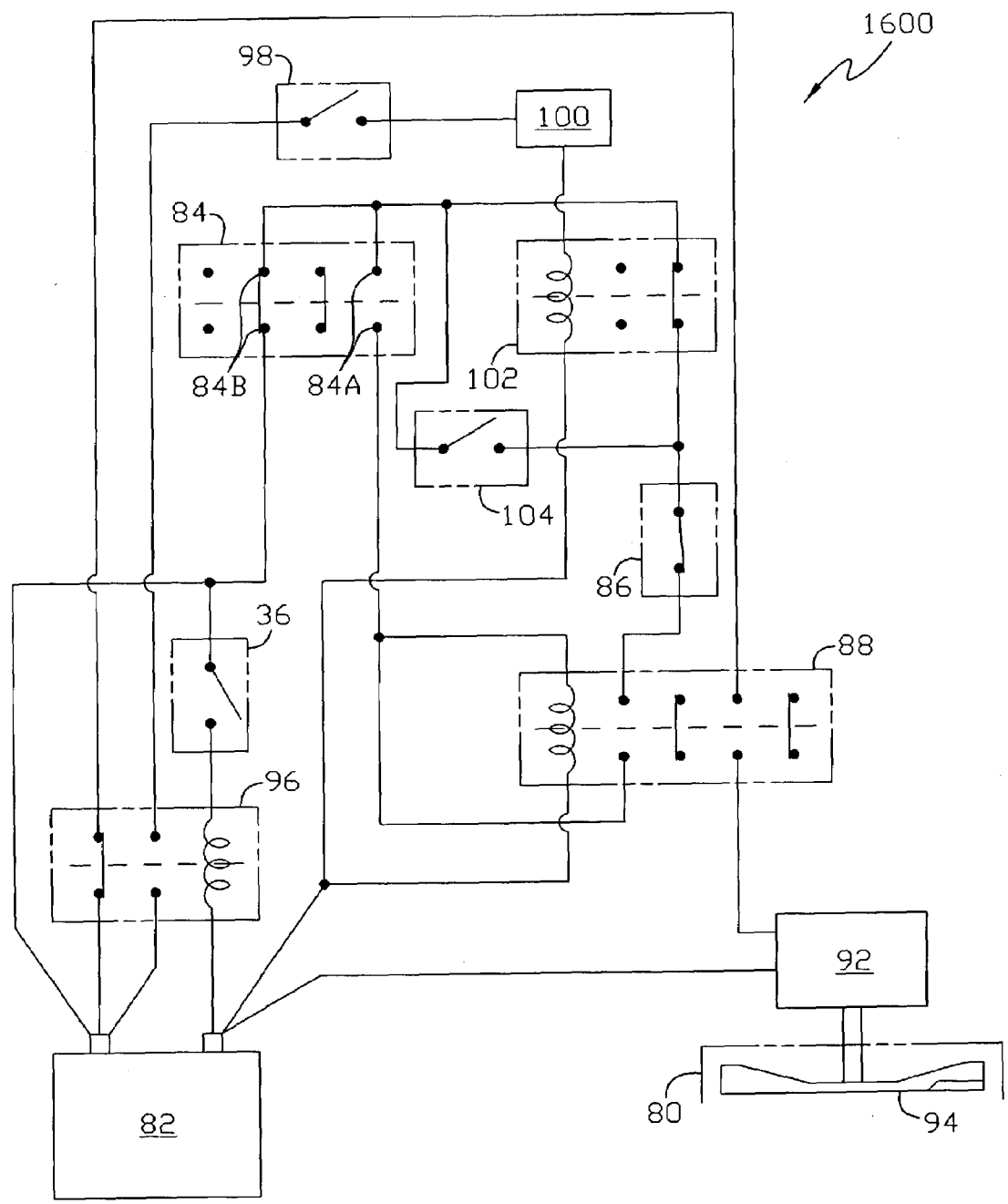
FIG. 21 is a schematic of an electric circuit in accordance with yet another embodiment of this invention, similar to that shown in FIG. 19.
Figure 22:
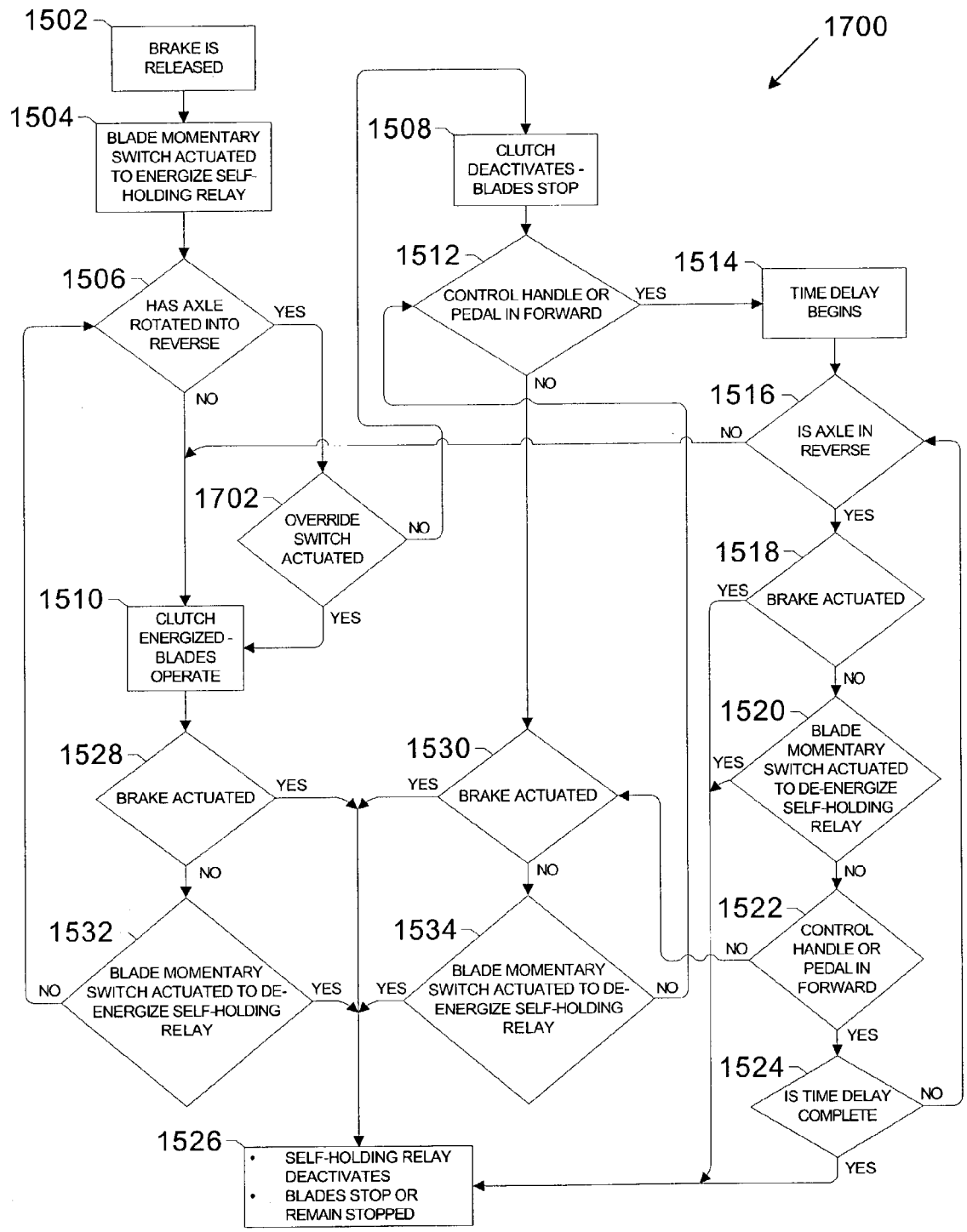
FIG. 22 is a flowchart of the embodiment depicted in FIG. 21.

FIG. 21 is a schematic circuit diagram 1600 showing another embodiment of a reverse blade cutoff switch constructed according to the present invention. FIG. 22 shows a flow diagram 1700 which demonstrates the functionality of circuit 1600. FIGS. 21 and 22 are very similar to FIGS. 19 and 20, except with the addition of a reverse cutoff bypass switch 104 coupled as shown in FIG. 21. Switch 104 is preferably mounted in a location easily accessible to an operator, such as a part of the transaxle hand control, mounted to the floor of the vehicle or a steering wheel mounted switch. If the operator believes that during a reversing operation relay 88 might become disengaged, and conditions permit allowing the blades 94 to operate while performing a reversing operation, the operator may depress switch 104, in step 1702 of FIG. 22, to maintain actuation of relay 88 during a reversing operation and subsequent movement forward.

While the above electrical schematics describe configurations using a blade clutch 92, such clutches are expensive and add complexity to a mower. Many current safety systems work by shutting off the vehicle engine or preventing the engine from starting when a predetermined state is achieved. An embodiment of the current invention in such a configuration is shown in FIGS. 23 and 24.

Figure 23:
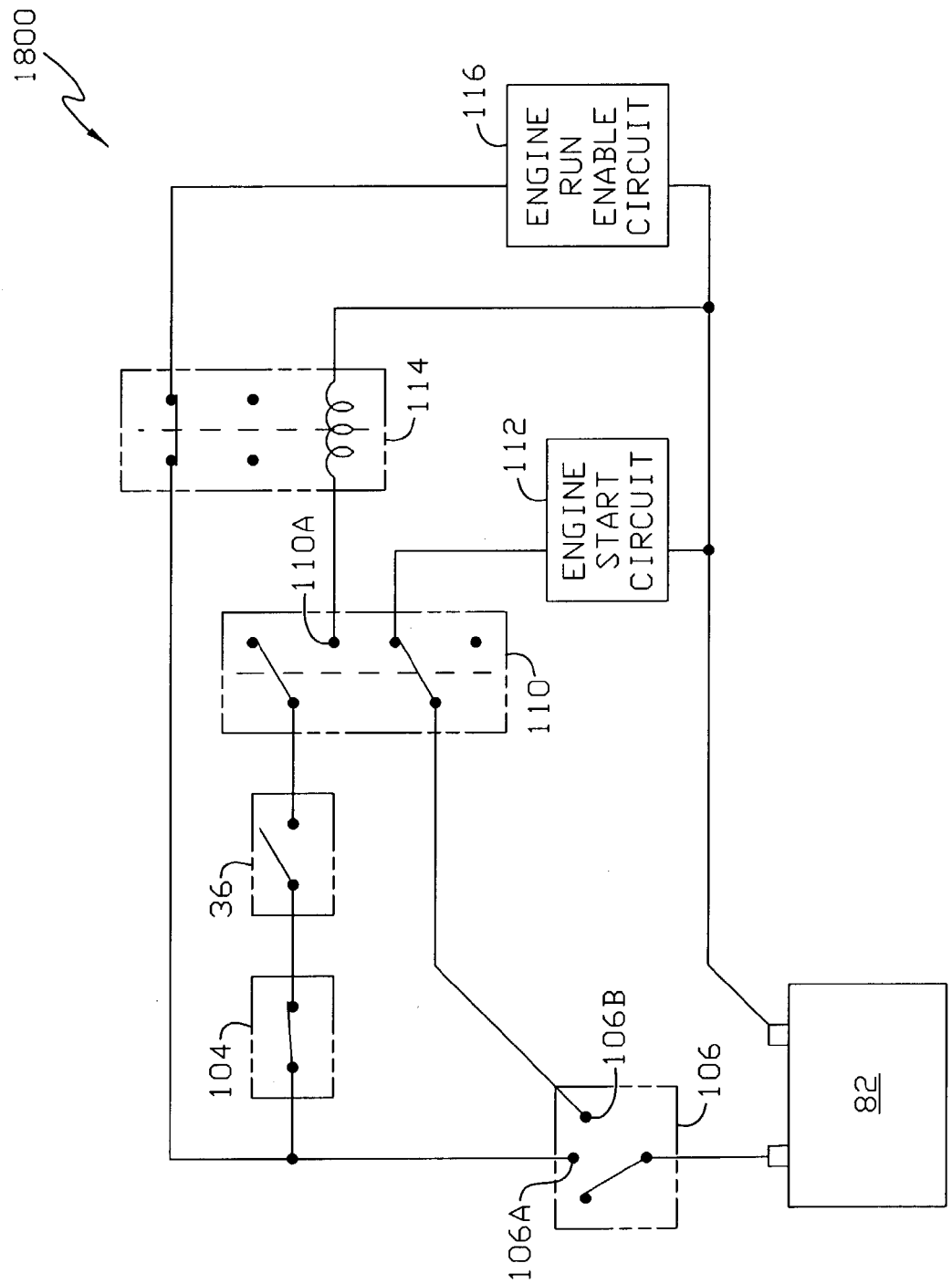
FIG. 23 is a schematic of an electric circuit in accordance with yet another embodiment of this invention.

The schematic circuit diagram 1800 shown in FIG. 23 uses a switch 110, which could be a part of the blade engagement mechanism, and switch 36. Switch 110 is used to determine whether it is safe to start vehicle engine 29, and switches 110 and 36 are used to determine whether it is safe to continue operation of vehicle engine 29. When ignition switch 106 is rotated to engage contact 106B, a voltage signal is then directed to contacts in switch 1110. If the blade engagement mechanism is in the disengaged position, the voltage signal is then connected to the engine start circuit 112, as shown, to allow the engine to be started. Once engine 29 has been started and ignition switch 106 is released so that contact 106A is engaged, a voltage signal will be passed through relay 114 to a circuit 116. Circuit 116 is preferably an engine-run enable circuit that permits the engine to keep operating. In some mower applications, circuit 116 will be associated with various safety switches such as the seat, brake or other elements not shown, which, if set into a predetermined position, may also cause vehicle engine 29 to be turned off.

In the circuit shown in FIG. 23, if axle shaft 30 rotates into reverse, then switch 36 will close to send a voltage signal to switch 110. If the mower blades are engaged, switch 110 will be switched opposite the position shown in FIG. 23 to connect voltage through contact 110A, thus energizing relay 114 and consequently removing a voltage signal from engine-run enable circuit 116, which will then cause vehicle engine 29 to be turned off. There is also an optional reverse cutoff bypass switch 104 which may be actuated if the operator specifically wants to avoid having engine 29 turned off, so that the user can allow blades 94 to operate while the vehicle is in reverse. Actuating switch 104 opens switch 104 so that a voltage signal that might otherwise actuate relay 114 due to the actuation of switch 36 and switch 110 will be prevented from doing so.

Figure 24:
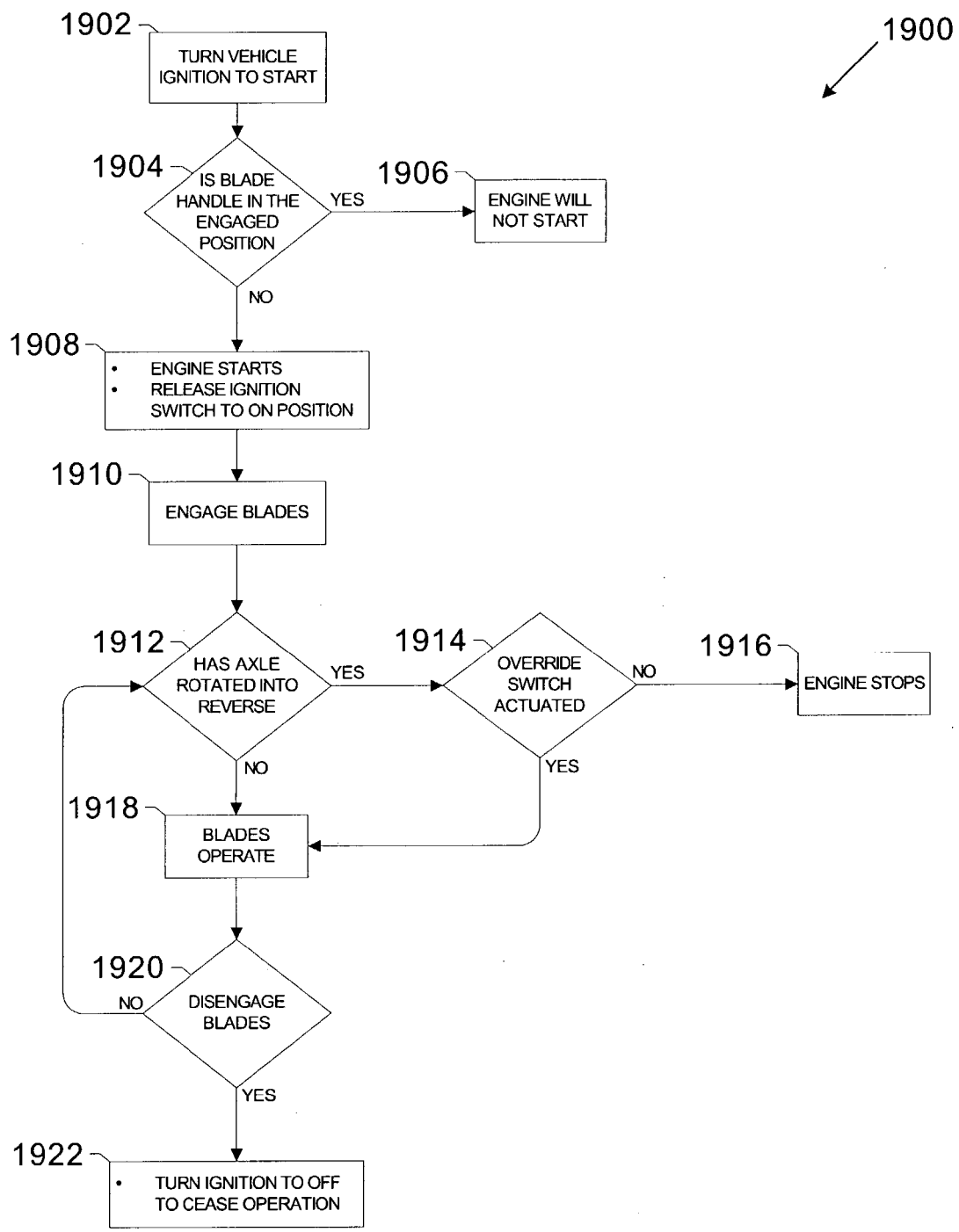
FIG. 24 is a flowchart of the embodiment depicted in FIG. 23.

FIG. 24 shows a flow diagram 1900 describing the functionality of circuit 1800. In step 1902 the operator operates ignition switch 106 to start engine 29. The process proceeds to step 1904 where it is determined whether the mower blade engagement mechanism is in the engaged position. If that handle is in the engaged position, then the process terminates with step 1906 because the engine will be prevented from starting. If the mower blade engagement mechanism is in the disengaged position the process will proceed to step 1908 where engine 29 starts. Once engine 29 starts, the operator will allow ignition switch 106 to move to the run position. In step 1910 the operator engages the mower blades 94. In step 1912 it is determined whether axle shaft 30 has rotated into the reverse position. If the axle shaft 30 has rotated into reverse, then the process will either move to step 1916 in which engine run circuit 116 is commanded to shut engine 29 down, or if a reverse cutoff override switch 104 is available, the process will determine whether that switch has been engaged. If switch 104 has not been engaged, then the process will continue on to step 1916 and engine 29 will be stopped. If switch 104 has been engaged, then the process will move to step 1918 and mower blades 94 will be allowed to operate. The process then determines whether blades 94 are disengaged; if blades 94 are not disengaged, then the process returns to step 1912. If blades 94 are disengaged, then the operator is free to turn off the engine at any time to cease operation at step 1922.

While specific electronic schematics and flow charts have been presented to describe certain exemplary embodiments of this invention, those skilled in the art will recognize that such schematics and flow charts may be accomplished in a variety of implementations using a variety of components that accomplish essentially the same function, and thus the disclosed schematics and flow charts are only representative and are not intended to be limiting.

The embodiments disclosed herein depict a hydrostatic transmission, where the various components are located in a common sump. The hydraulic oil used in such hydrostatic transmissions or transaxles has a negligible electrical conductivity; it will also be understood that appropriate seals will be required for the various components penetrating the housing in such a device, such as switch 36. This invention could also readily be used in mechanical transmissions or transaxles.

Those skilled in the art should understand that various commercially available switches can be used to implement the proximity switches described above. Suitable switches include inductive proximity switches, magnetic proximity switches, and low actuating force switches. Exemplary inductive proximity switches include models made by Honeywell, and the PRX 800 series available from Sacramento Electronic Supply. Exemplary magnetic proximity switches include the MS-20 proximity switch available from Rodale Technical Sales, Inc. and models made by Jackson Research, Ltd. A suitable low actuating force switch is manufactured by Veeder-Root. The switches used must be suitable for the expected operating environment.

It is to be understood that the above description of the invention should not be used to limit the invention, as other embodiments and uses of the various features of this invention will be obvious to one skilled in the art. This invention should be read as limited by the scope of its claims only.

We claim:

1. A transmission system for use in a vehicle having an engine, drive wheels and an output device, the system comprising:

a transmission comprising a housing, an input driven by the engine and at least one shaft driven by the input, where rotation of the shaft in the forward direction corresponds to forward rotation of the drive wheels and rotation of the shaft in a second, opposite direction corresponds to reverse rotation of the drive wheels; and a sensor mounted in the transmission housing and positioned to detect the rotational direction of the shaft.

2. A transmission system as set forth in claim 1, further comprising an electronic circuit connected to the sensor to change the operational status of the vehicle output device depending on the rotational direction of the shaft.

3. A transmission system as set forth in claim 2, wherein the output device comprises a mower deck having mower blades.

4. A transmission system as set forth in claim 3, wherein the electronic circuit acts to turn off the mower blades when the shaft is rotated in reverse.

5. A transmission system as set forth in claim 4, where the shaft comprises an output axle of the transmission.

6. A transmission system as set forth in claim 5, wherein the transmission comprises a hydrostatic transmission.

7. A transmission system as set forth in claim 1, further comprising:

an actuator rotatably mounted on the shaft and moveable between a first position when the shaft rotates in the forward direction and a second position when the shaft rotates in the second, opposite direction; and where the sensor comprises a proximity switch mounted in the housing adjacent to the actuator, where the proximity switch is not triggered when the actuator moves in the forward direction and is triggered when the actuator moves in the second direction.

8. A transmission system as set forth in claim 7, where the first rotational direction of the shaft corresponds to forward movement of the drive wheels, and the second, opposite rotational direction of the shaft corresponds to reverse movement of the drive wheels.

9. A transmission system as set forth in claim 2, where the shaft comprises an output axle of the transmission.

10. A transmission system as set forth in claim 2, wherein the transmission comprises:

a hydrostatic transmission mounted in the transmission housing;

a hydraulic motor output shaft mounted in the housing and rotatably driven by the hydrostatic transmission;

a differential engaged to and driven by the motor output shaft.

11. A transmission system as set forth in claim 10, wherein the sensor comprises a proximity switch.

12. A transmission system as set forth in claim 11, wherein the proximity switch is positioned to detect the rotational direction of the motor output shaft.

13. A transmission system as set forth in claim 12, further comprising a gear train engaged to and driven by the motor output shaft and engaged to and driving the differential, the gear train comprising at least one rotatable gear shaft.

14. A transmission system as set forth in claim 1, wherein the sensor comprises a mechanical switch.

15. A transmission system as set forth in claim 7, wherein the sensor comprises a mechanical switch having a plurality of leads extending therefrom, and the actuator comprises a plurality of contacts mounted thereon, and the actuator is movable between a first position when the shaft is moved in the forward direction and the contacts do not contact the leads, and a second position when the shaft is moved in the second, opposite direction and the contacts engage the leads to close the mechanical switch.

16. A vehicle safety system for use in a vehicle having an engine, a transmission engaged to the engine and driving a pair of output axles, and a vehicle output device, the safety system comprising:
  detection means for detecting the rotational direction of one of the output axles; and
  signal generating means for generating a signal based on the rotational direction of the one of the output axles.

17. A vehicle safety system as set forth in claim 16, further comprising actuating means responsive to the signal generating means for changing the operational status of the vehicle output device depending on the direction of rotation of the one output axle.

18. A vehicle safety system as set forth in claim 17, wherein the actuating means comprises an electronic circuit which acts to turn off the output device when the one output axle is rotated in reverse.

19. A vehicle safety system as set forth in claim 18, wherein the vehicle output device comprises a mower deck.

20. A vehicle safety system as set forth in claim 16, wherein the transmission comprises a hydrostatic transmission.

21. A vehicle safety system as set forth in claim 16, where the detection means comprises an actuator rotatably mounted on the one axle and moveable between a first position when the output axle rotates in a first direction and a second position when the output axle rotates in a second, opposite direction.

22. A vehicle safety system as set forth in claim 21, wherein the signal generating means comprises a proximity switch mounted adjacent to the actuator.

23. A vehicle safety system as set forth in claim 21, wherein the signal generating means comprises a mechanical switch.

24. A vehicle comprising:
  a transmission mounted on a vehicle frame and driving a pair of output axles;
  an output device driven by the engine;
  a sensor positioned to detect the rotational direction of one of the output axles; and
  an electronic circuit connected to the sensor to change the operational status of the vehicle output device depending on the rotational direction of the one of the output axles.

25. A vehicle as set forth in claim 24, wherein the output device comprises a mower deck having mower blades.

26. A vehicle as set forth in claim 25, wherein the electronic circuit acts to turn off the mower blades when the one output axle is rotated in reverse.

27. A vehicle as set forth in claim 24, wherein the transmission comprises a hydrostatic transmission.

28. A vehicle as set forth in claim 24, further comprising an actuator rotatably mounted on the one output axle and moveable between a first position when the one output axle rotates in a first direction and a second position when the one output axle rotates in a second, opposite direction.

29. A vehicle as set forth in claim 28, where the first rotational direction of the one output axle corresponds to forward movement of drive wheels of the vehicle, and the second, opposite rotational direction of the one output axle corresponds to reverse movement of the drive wheels.

30. A vehicle as set forth in claim 24, wherein the transmission comprises:
  a hydrostatic transmission mounted in the transmission housing;
  a hydraulic motor output shaft mounted in the housing and rotatably driven by the hydrostatic transmission;
  a differential engaged to and driven by the motor output shaft, wherein the differential drives the pair of output axles.

31. A vehicle as set forth in claim 30, further comprising a gear train engaged to and driven by the motor output shaft and engaged to and driving the differential, the gear train comprising at least one rotatable gear shaft.

32. A vehicle as set forth in claim 24, wherein the sensor comprises a proximity switch.

33. A vehicle as set forth in claim 24, wherein the sensor comprises a mechanical switch.

34. A vehicle as set forth in claim 28, wherein the sensor comprises a mechanical switch having a plurality of leads extending therefrom, and the actuator comprises a plurality of contacts mounted thereon, and the actuator is movable between a first position when the shaft is moved in the forward direction and the contacts do not contact the leads, and a second position when the shaft is moved in the reverse direction and the contacts engage the leads to close the mechanical switch.

35. A vehicle comprising:
  an engine mounted on a vehicle frame;
  a transmission comprising an input driven by the engine and at least one rotatable transmission shaft driven by the input;
  an output device mounted on the vehicle and driven by the engine; and
  a sensor positioned to detect the rotational direction of the transmission shaft.

36. A vehicle as set forth in claim 35, further comprising an electronic circuit connected to the sensor to change the operational status of the vehicle output device depending on the rotational direction of the shaft.

37. A vehicle as set forth in claim 36, wherein the output device comprises a mower deck.

38. A vehicle as set forth in claim 35, wherein the shaft comprises an output axle.

39. A vehicle as set forth in claim 35, further comprising an actuator rotatably mounted on the shaft and moveable between a first position when the shaft rotates in a first direction and a second position when the shaft rotates in a second, opposite direction.

40. A vehicle as set forth in claim 39, wherein the sensor comprises a proximity switch positioned adjacent to the actuator, where the proximity switch is not triggered when the actuator moves in the first direction and is triggered when the actuator moves in the second direction.

41. A vehicle as set forth in claim 40, where the first rotational direction of the shaft corresponds to forward movement of drive wheels of the vehicle, and the second, opposite rotational direction of the shaft corresponds to reverse movement of the drive wheels.

42. A vehicle as set forth in claim 35, wherein the transmission comprises a hydrostatic transmission.

43. A vehicle as set forth in claim 36, wherein the transmission comprises:
  a hydrostatic transmission mounted in the transmission housing;
  a hydraulic motor output shaft mounted in a housing and rotatably driven by the hydrostatic transmission;
  a differential engaged to and driven by the motor output shaft.

44. A vehicle as set forth in claim 43, further comprising a gear train engaged to and driven by the motor output shaft and engaged to and driving the differential, the gear train comprising at least one rotatable gear shaft.

* * * * *

UNITED STATES PATENT AND TRADEMARK OFFICE
CERTIFICATE OF CORRECTION

PATENT NO.    : 6,951,093 B1                                        Page 1 of 1
DATED         : October 4, 2005
INVENTOR(S)   : Raymond Hauser, Lonnie E. Holder and Scott W. Keller It is certified that error appears in the above-identified patent and that said Letters Patent is hereby corrected as shown below:

Column 10,
Lines 34-38, delete Claim 8.

Signed and Sealed this

Twenty-eighth Day of March, 2006

JON W. DUDAS
*Director of the United States Patent and Trademark Office*